(12) United States Patent
Landau

(10) Patent No.: US 12,232,644 B2
(45) Date of Patent: Feb. 25, 2025

(54) MANUAL BREWING PRESS WITH LEVER HOOK AND METHOD OF OPERATING THE SAME

(71) Applicant: Sergio Landau, Laguna Niguel, CA (US)

(72) Inventor: Sergio Landau, Laguna Niguel, CA (US)

( * ) Notice: Subject to any disclaimer, the term of this patent is extended or adjusted under 35 U.S.C. 154(b) by 938 days.

(21) Appl. No.: 17/338,424

(22) Filed: Jun. 3, 2021

(65) Prior Publication Data
US 2022/0386805 A1    Dec. 8, 2022

(51) Int. Cl.
*A47J 31/38* (2006.01)
*A47J 31/00* (2006.01)
*A47J 31/44* (2006.01)
*A47J 31/52* (2006.01)

(52) U.S. Cl.
CPC ............. *A47J 31/38* (2013.01); *A47J 31/005* (2013.01); *A47J 31/4407* (2013.01); *A47J 31/5253* (2018.08)

(58) Field of Classification Search
CPC ...... A47J 31/38; A47J 31/5253; A47J 31/005; A47J 31/4407
See application file for complete search history.

(56) References Cited

U.S. PATENT DOCUMENTS

| | | | | |
|---|---|---|---|---|
| 194,702 | A | * | 8/1877 | Mayerhofer ............ A47J 31/20 99/297 |
| 2006/0123998 | A1 | * | 6/2006 | Castellani ........... A47J 31/0673 99/495 |
| 2014/0305313 | A1 | * | 10/2014 | Waldron ................ A47J 31/469 99/290 |
| 2014/0373723 | A1 | * | 12/2014 | Vestreli ................... A47J 31/52 99/285 |
| 2018/0360257 | A1 | * | 12/2018 | Dionisio .................. A47J 31/38 |
| 2020/0359834 | A1 | * | 11/2020 | Marchesan .......... A47J 31/4403 |
| 2021/0289980 | A1 | * | 9/2021 | Zhan ....................... A47J 31/38 |

FOREIGN PATENT DOCUMENTS

CN       210446722 U   *   5/2020

OTHER PUBLICATIONS

CN210446722 Manual coffee machine—translation (Year: 2024).*

* cited by examiner

*Primary Examiner* — Steven W Crabb
*Assistant Examiner* — Keith Brian Assante
(74) *Attorney, Agent, or Firm* — Rutan & Tucker, LLP; Kyle M. St. James

(57) ABSTRACT

A manual brewing press with a lever assembly including a post, a base, a press plate extending from the post, and an elongated lever with an attached lever hook. A brew head is configured to be inserted into a top of the press plate and comprises a cylinder and a piston with a plunger disposed inside the cylinder and a stem integrating a pressure gauge. A sealing element is disposed adjacent to at least one of the stem and the plunger. A portafilter attaches to the press plate underside. The lever hook engages the stem of the piston, moves the plunger down and up inside the cylinder as the elongated lever is lowered and raised respectively, pushing water inside the cylinder down through coffee grounds in the portafilter when the elongated lever is lowered, and pulling the plunger back up when the elongated lever is raised for a subsequent brewing.

19 Claims, 26 Drawing Sheets

MANUAL BREWING PRESS WITH LEVER HOOK AND METHOD OF OPERATING THE SAME

FIELD OF THE INVENTION

This disclosure relates generally to devices and methods to make beverages. More specifically, the disclosure pertains to a manual brewing press and method of using the press to brew espresso and other beverages.

BACKGROUND OF THE INVENTION

Drinking brewed beverages such as coffee and tea has long been a favorite pastime for people when socializing with their family and friends, while for others it is an ideal, if not necessary, start of the day. Due to the high cost of buying coffee or tea at a coffee shop on a regular or semi-regular basis, many people and companies are purchasing brewing presses for their homes and workplaces. Automatic brewing presses are very expensive and exceed many people's budgets. Thus, various hand operated presses have been developed to provide a compact, relatively inexpensive alternative to daily visits to a coffee shop and/or purchase of a high-end, automatic espresso machine. Unfortunately, many manually operated brewing presses have their own drawbacks. For example, manual presses may have complex mechanisms such as pumps and valves that may fail or require a degree of training for a user to properly operate or simply require more than should be expected of an user early in the morning, before he has had his coffee. Other manual presses may be difficult to clean or do not maintain a steady temperature during the preheating or brewing process. Accordingly, the instant disclosure seeks to overcome the above challenges by providing a manual brewing press with a superior functionality.

BRIEF SUMMARY OF THE INVENTION

In an embodiment of the disclosure, a manual brewing press comprises a lever assembly including a post, a press plate extending from the post, an elongated lever, and a lever hook attached to the elongated lever. A base may be attached to the post of the lever assembly at a position lower than the press plate and the elongated lever. The brewing press further including a brew head configured to be inserted into a top of the press plate, the brew head comprising a cylinder and a piston, wherein the piston comprises a plunger disposed inside the cylinder and a stem integrating a pressure gauge, and a portafilter configured to attach to an underside of the press plate. In an embodiment, the lever hook of the elongated lever is configured to engage to the stem of the piston, wherein, when in an engaged position, the lever hook is configured to move the plunger of the piston down and up inside the cylinder as the elongated lever is moved down and up respectively, pushing water inside the cylinder down through coffee grounds in the portafilter when the elongated lever is lowered, and pulling the piston back up when the elongated lever is raised to prompt the brew head for a subsequent brewing. In an embodiment, at least one resilient sealing element is disposed adjacent to at least one of the piston and the stem. In an embodiment, the lever hook is configured to disengage from the stem of the piston to allow a user to easily remove the brew head from the top of the press plate for cleaning. In an embodiment, the at least one resilient sealing element is a resilient sealing ring disposed around at least one of the plunger and the stem to provide a watertight seal at an engagement between the plunger and the stem.

In another embodiment of the disclosure, a manual brewing press comprises a lever assembly comprising a post, a press plate extending from the post, an elongated lever, and a lever hook attached to the elongated lever; a base attached to the post of the lever assembly at a position lower than the press plate and the elongated lever; a brew head configured to be inserted into a top of the press plate, the brew head comprising a cylinder, a piston, and an electric heating element in contact with an outside surface of the cylinder and configured to heat the brew head, wherein the piston comprises a plunger disposed inside the cylinder and a stem integrating a pressure gauge; and a portafilter configured to attach to an underside of the press plate. The lever hook of the elongated lever is configured to engage to the stem of the piston, such that at an engaged position, the lever hook is configured to move the stem and plunger down and up inside the cylinder as the elongated lever is moved down and up, respectively pushing water inside the cylinder down through coffee grounds in the portafilter when the elongated lever is lowered, and pulling the plunger back up when the elongated lever is raised to prompt the brew head for a subsequent brewing.

In an embodiment, the manual brewing press further comprises at least one resilient sealing element disposed adjacent to at least one of the plunger and the stem to provide a watertight seal at an engagement between the plunger and the stem. The lever hook is also configured to disengage from the stem of the piston to allow a user to easily remove the brew head from the top of the press plate for cleaning.

In an embodiment, the manual brewing press further comprises a temperature control system including a temperature sensor attached to the cylinder and a temperature control box with an input side electrically connected to a power supply and an output side electrically connected to the electric heating element and the temperature sensor. In this embodiment the temperature control box may be configured to receive temperature readings from the temperature sensor and allow the electric heating element to continue to heat the brew head until it reaches a preset temperature of the brew head set by the user on the temperature control box. In an embodiment, once the preset temperature is achieved, the temperature control box is configured to maintain the preset temperature until the user turns off the power supply to the temperature control box.

An embodiment of the disclosure provides a method of making a beverage using a manual brewing press. The method comprises attaching a portafilter comprising coffee grounds to an underside of a press plate extending from a post of a lever assembly that is attached to a base, and pouring water into a cylinder disposed in a brew head, wherein the brew head is removably inserted into a top of the press plate and the brew head comprises a piston, wherein the piston comprises a plunger disposed inside the cylinder and a stem integrating a pressure gauge, and wherein at least one resilient sealing element is disposed adjacent to at least one of the plunger and the stem to provide a watertight seal at the engagement of the plunger and the stem. The method further includes engaging a lever hook attached to an elongated lever of the lever assembly to the stem of the piston by swinging the lever hook around a horizontal post on the stem and lowering the elongated lever, when the lever hook is in an engaged position, by applying a downward pressure on the elongated lever, wherein the lowering of the elongated lever causes the plunger of the piston to move down inside the cylinder and pushes the water inside the cylinder down through the coffee grounds in the portafilter and into a drinking vessel disposed thereunder. In an embodiment, the method further includes raising the elongated lever back up by applying an upward pressure on the elongated lever which pulls the plunger of the piston back up inside the cylinder and prompts the brew head for a subsequent brewing.

BRIEF DESCRIPTION OF THE DRAWINGS

Figure 1:
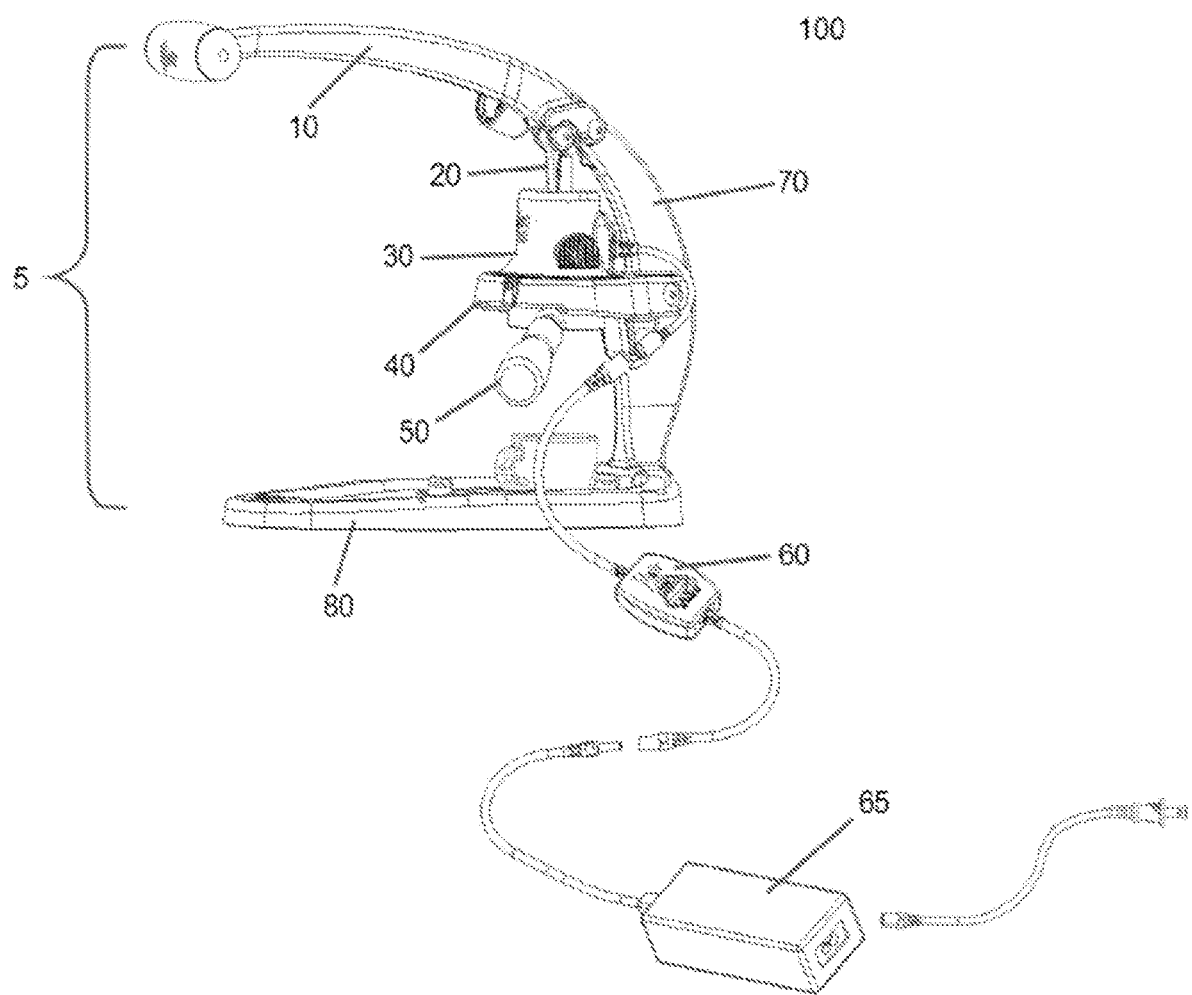
Figure 2:
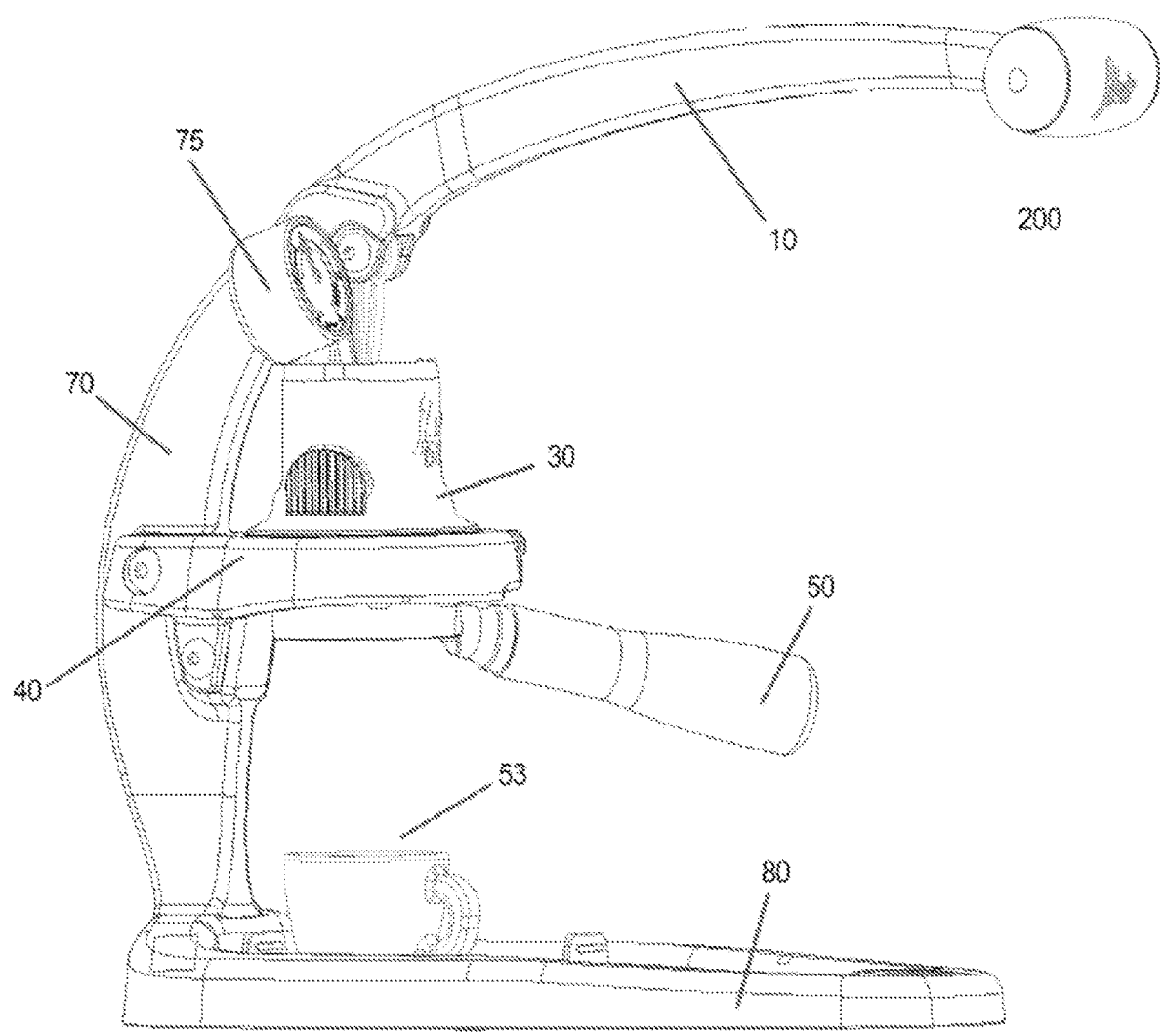
Figure 3:
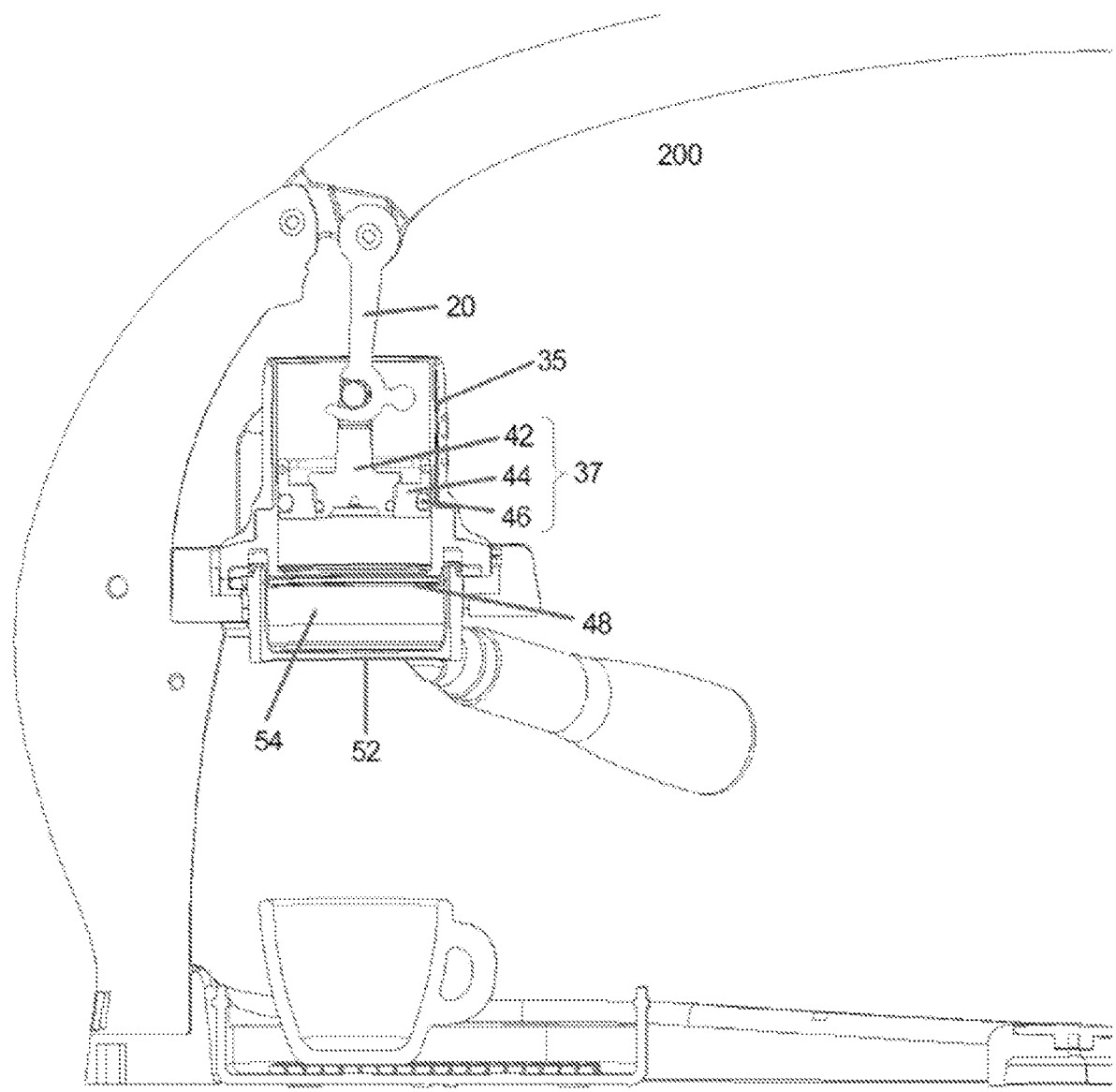
Figure 4:
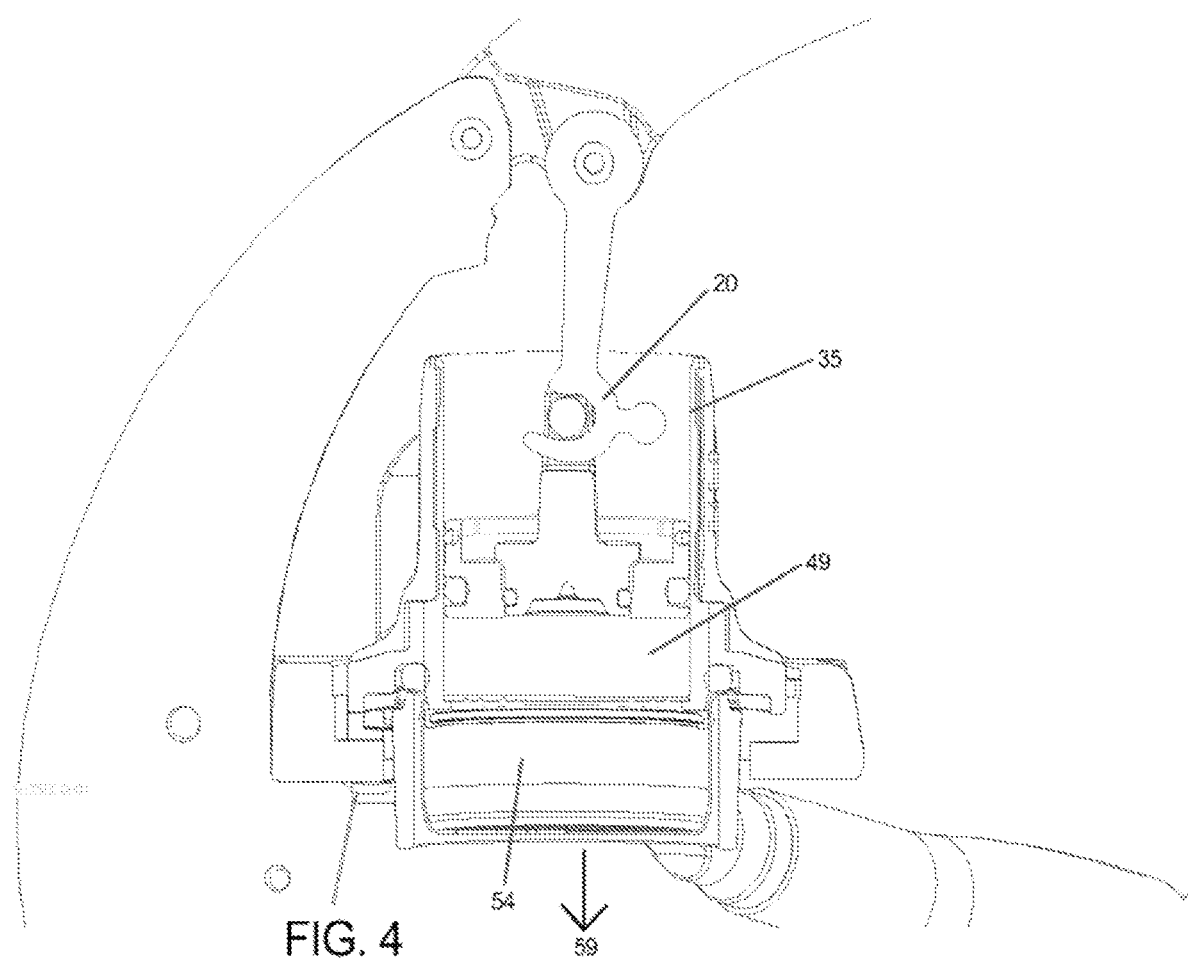
Figure 5:
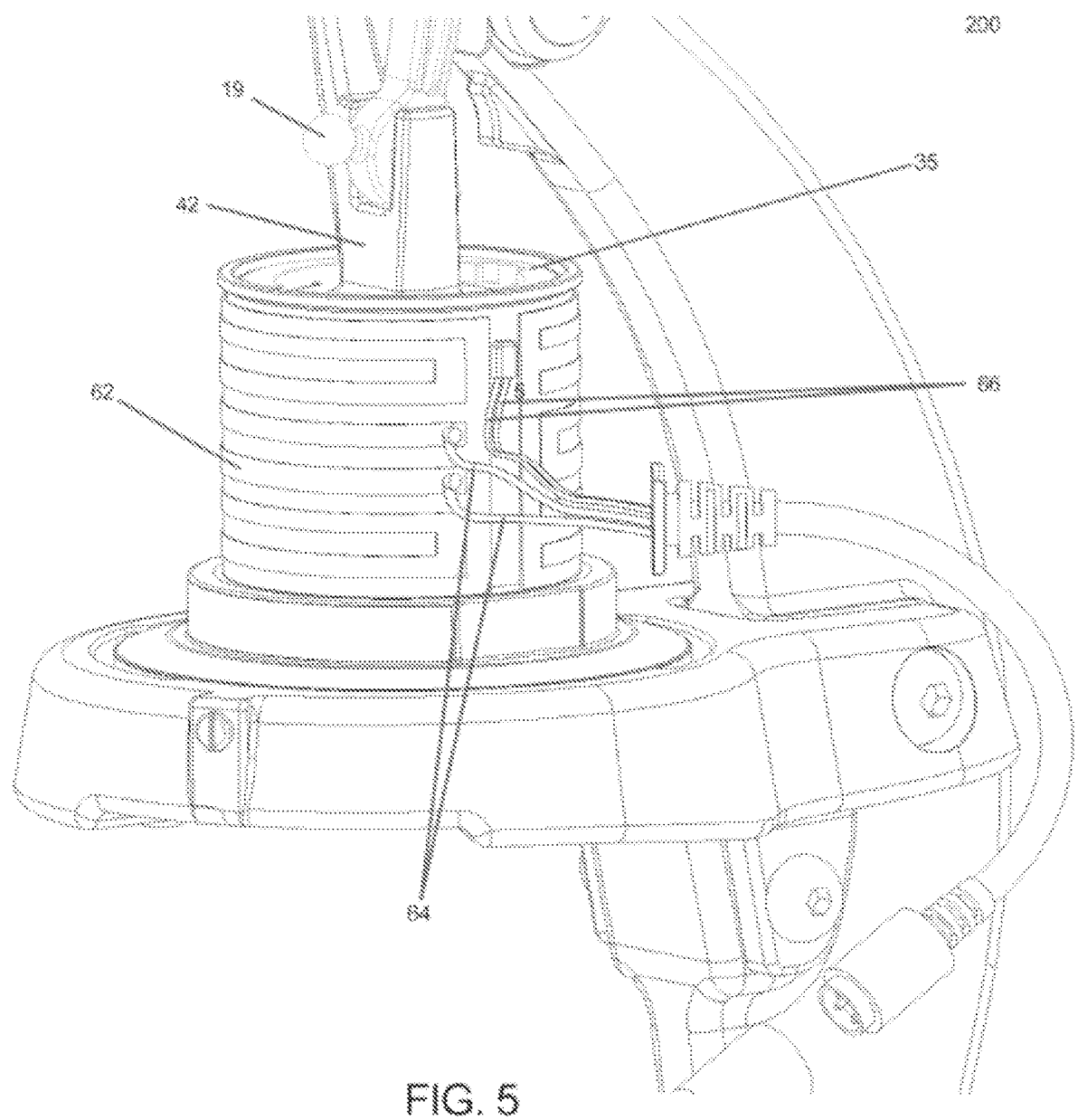
Figure 6:
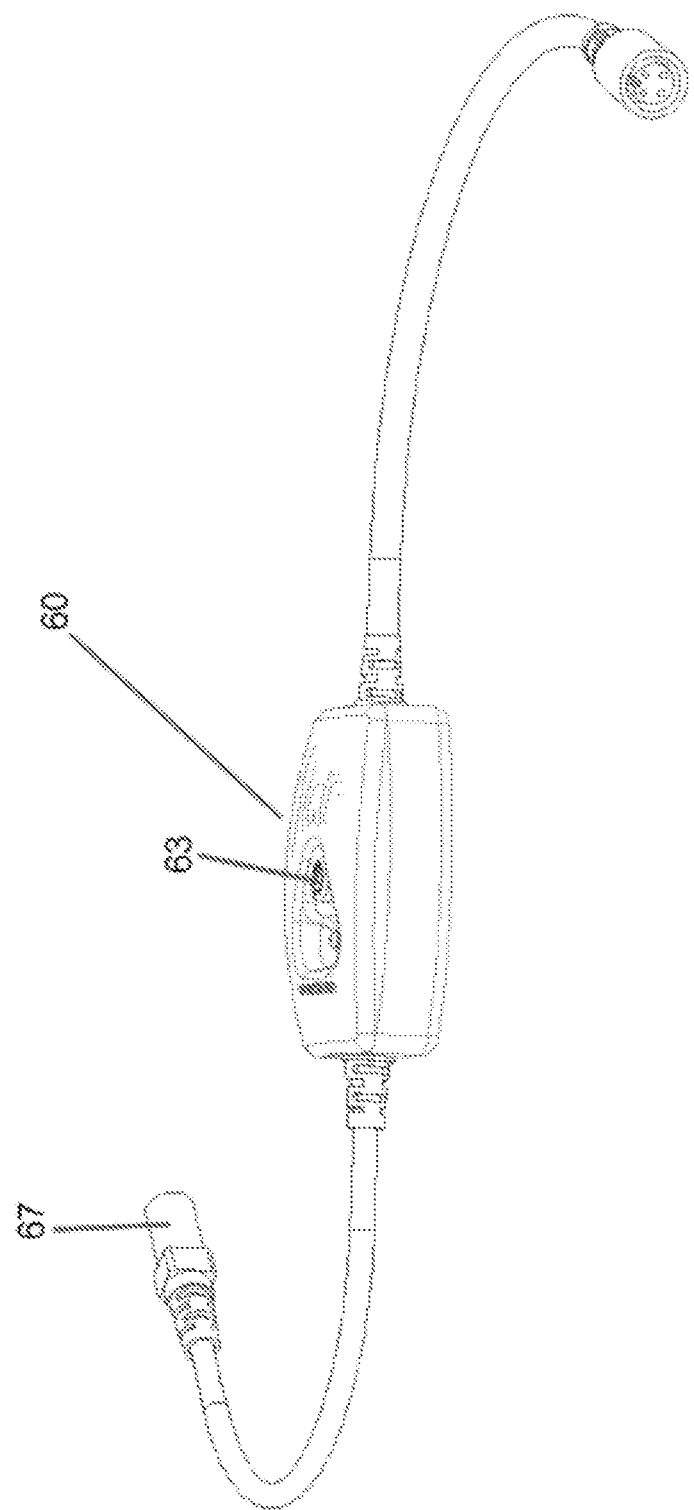
Figure 7:
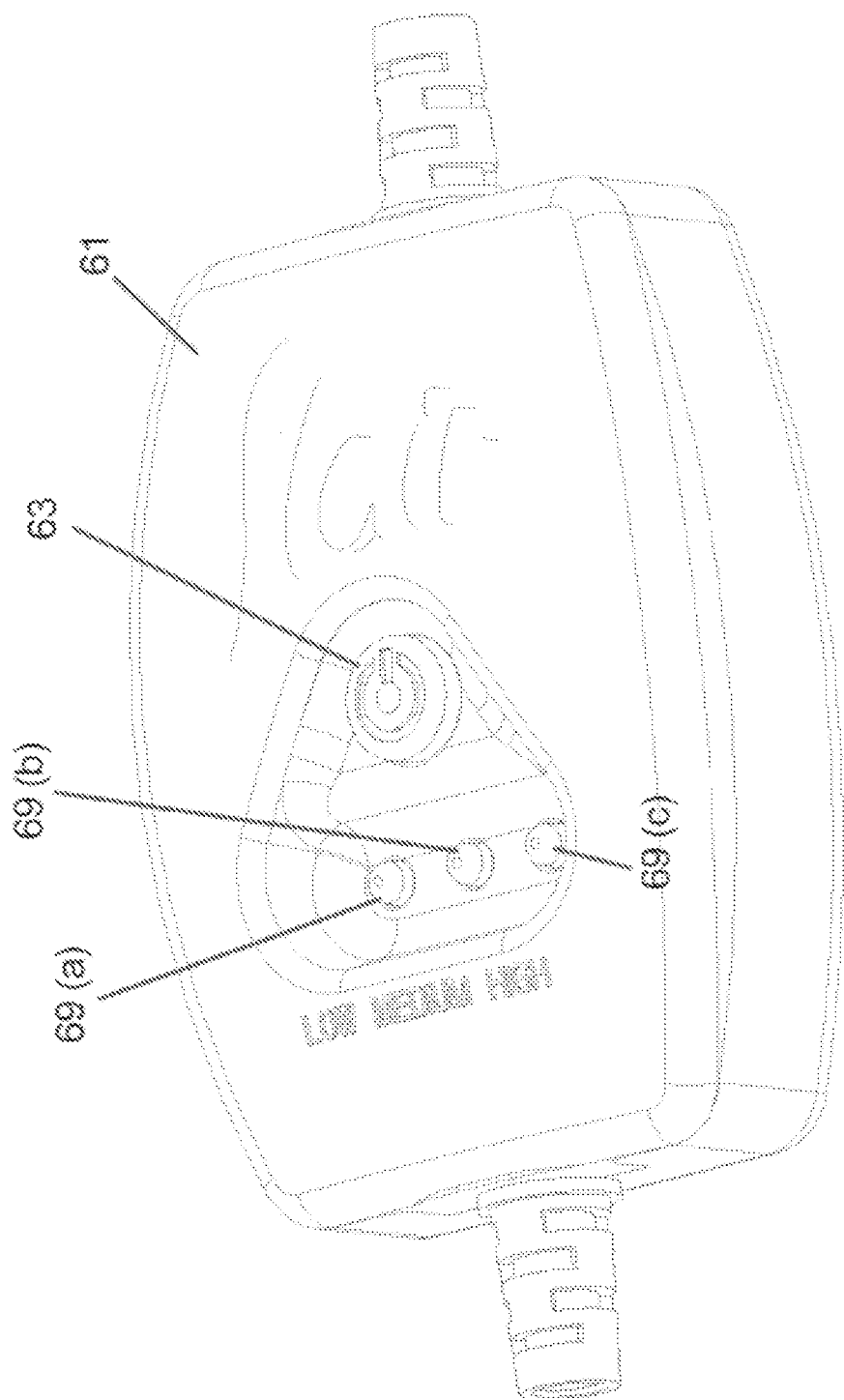
Figure 8:
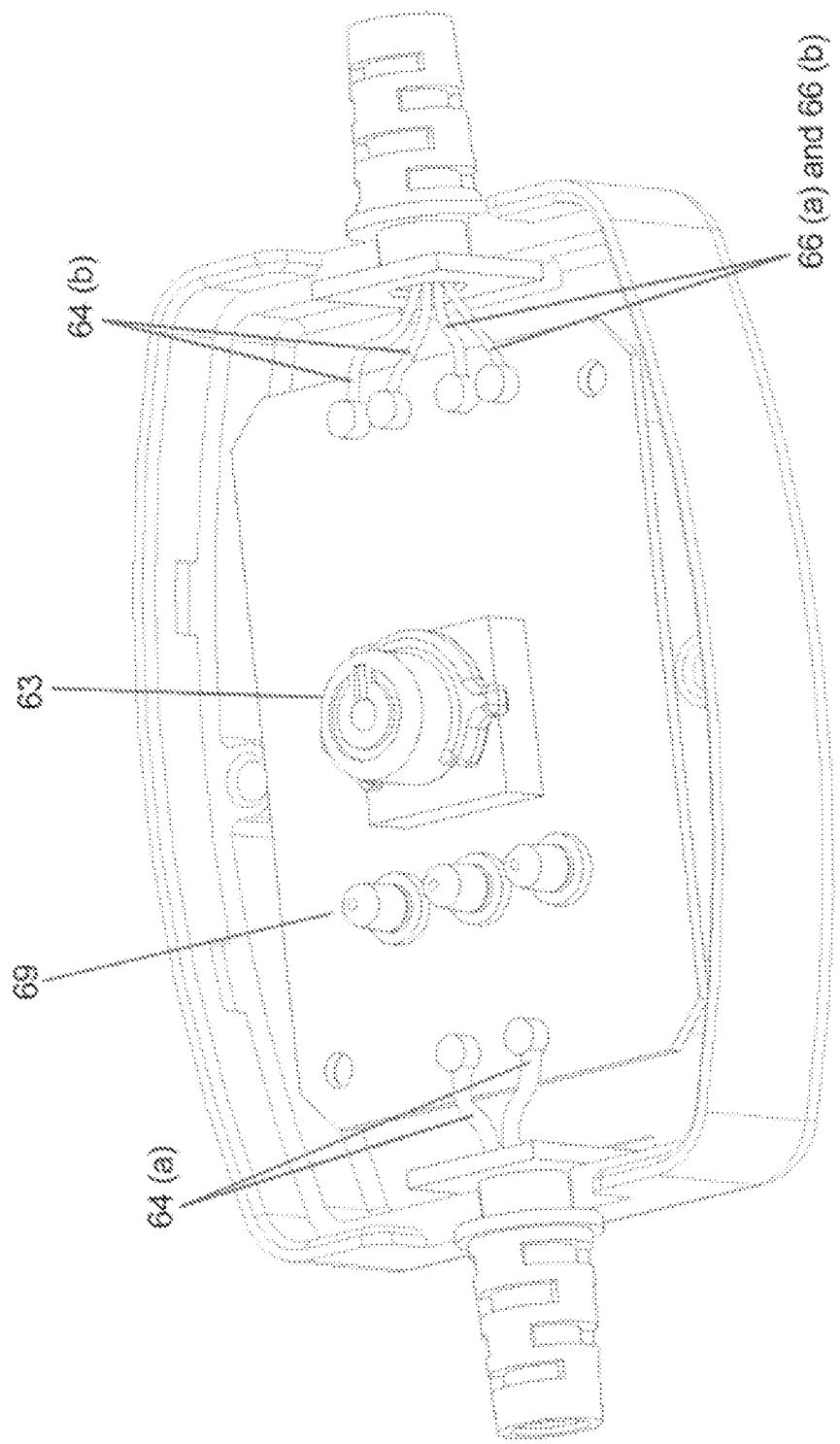
Figure 9:
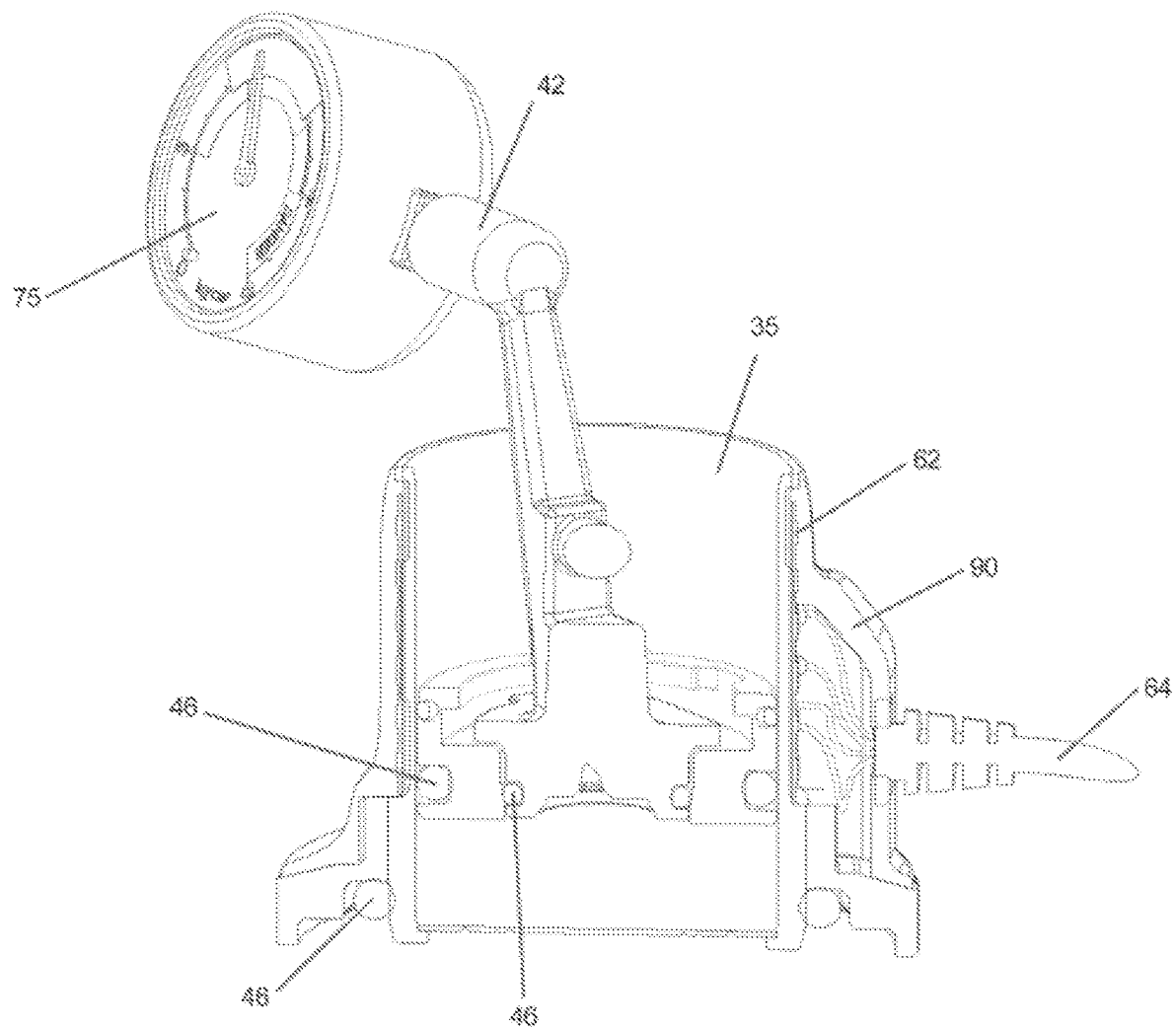
Figure 10:
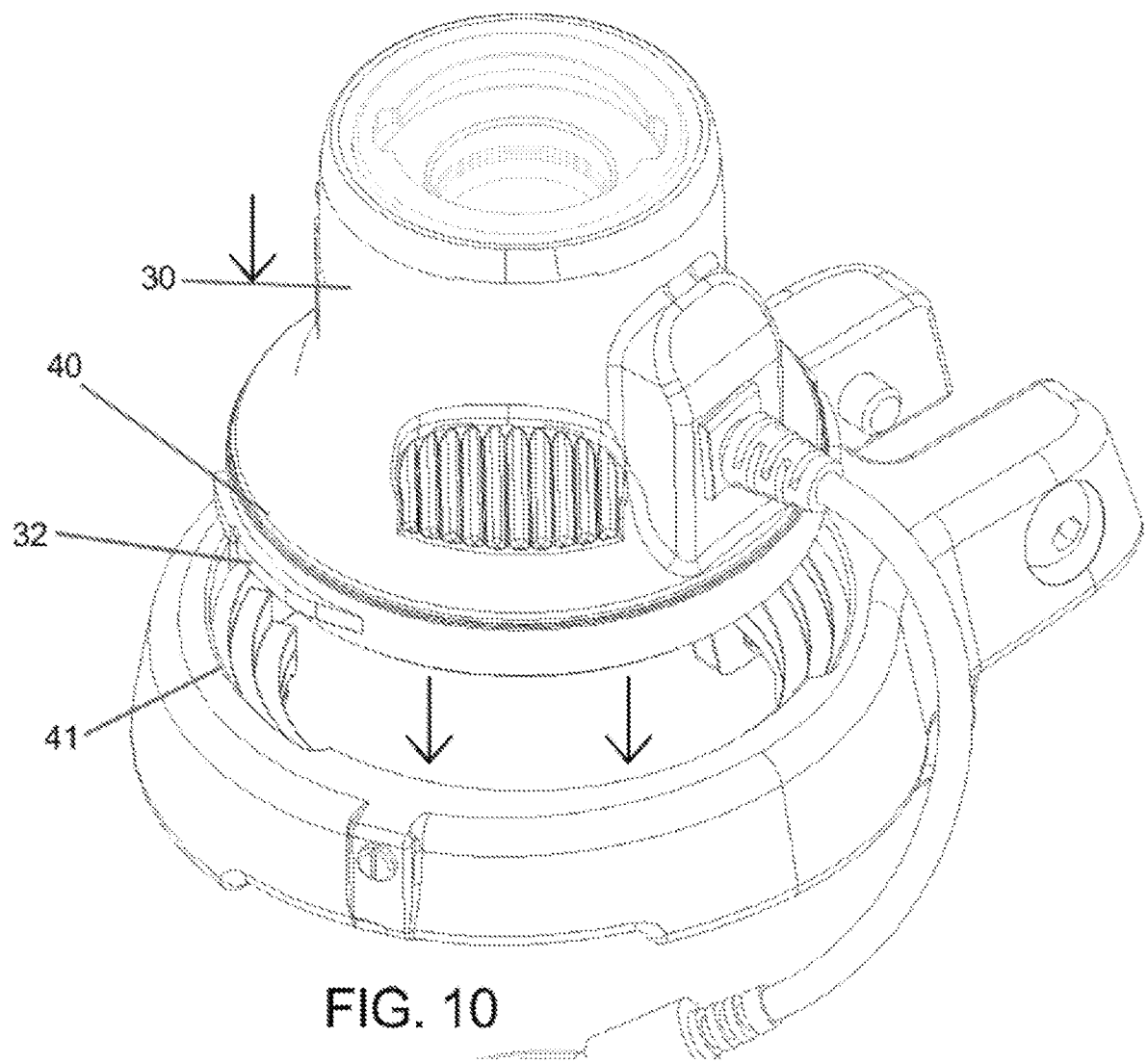
Figure 11:
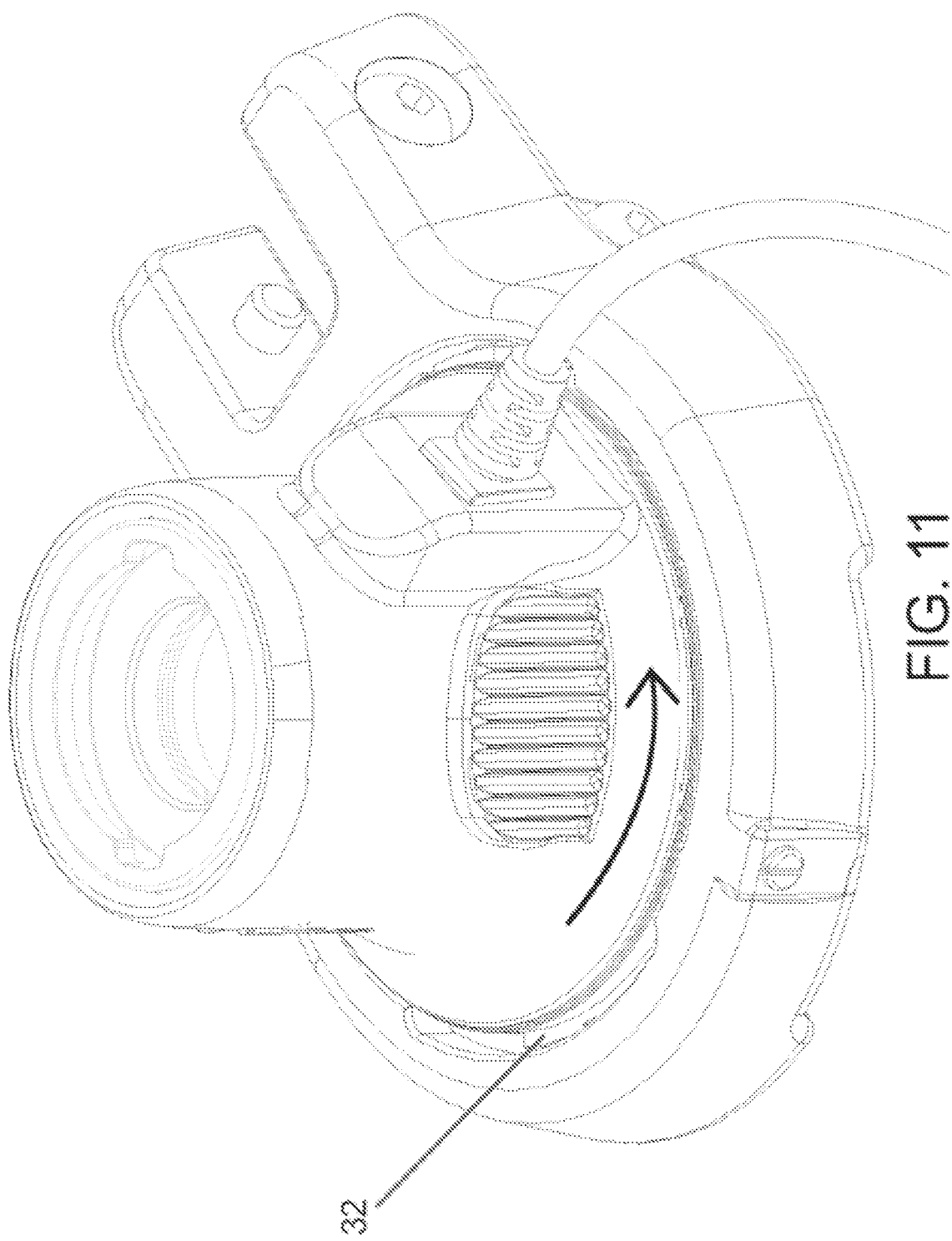
Figure 12:
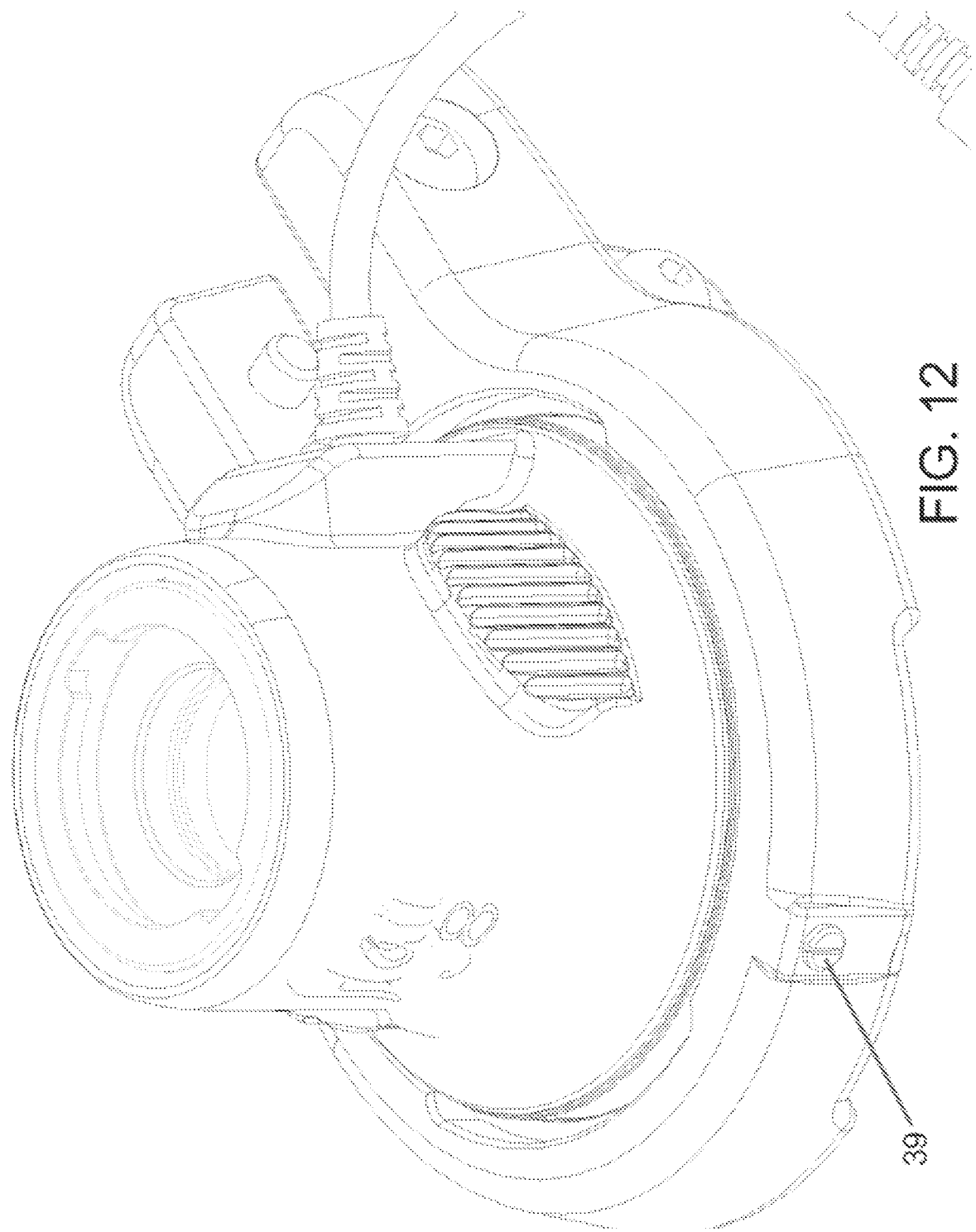
Figure 13:
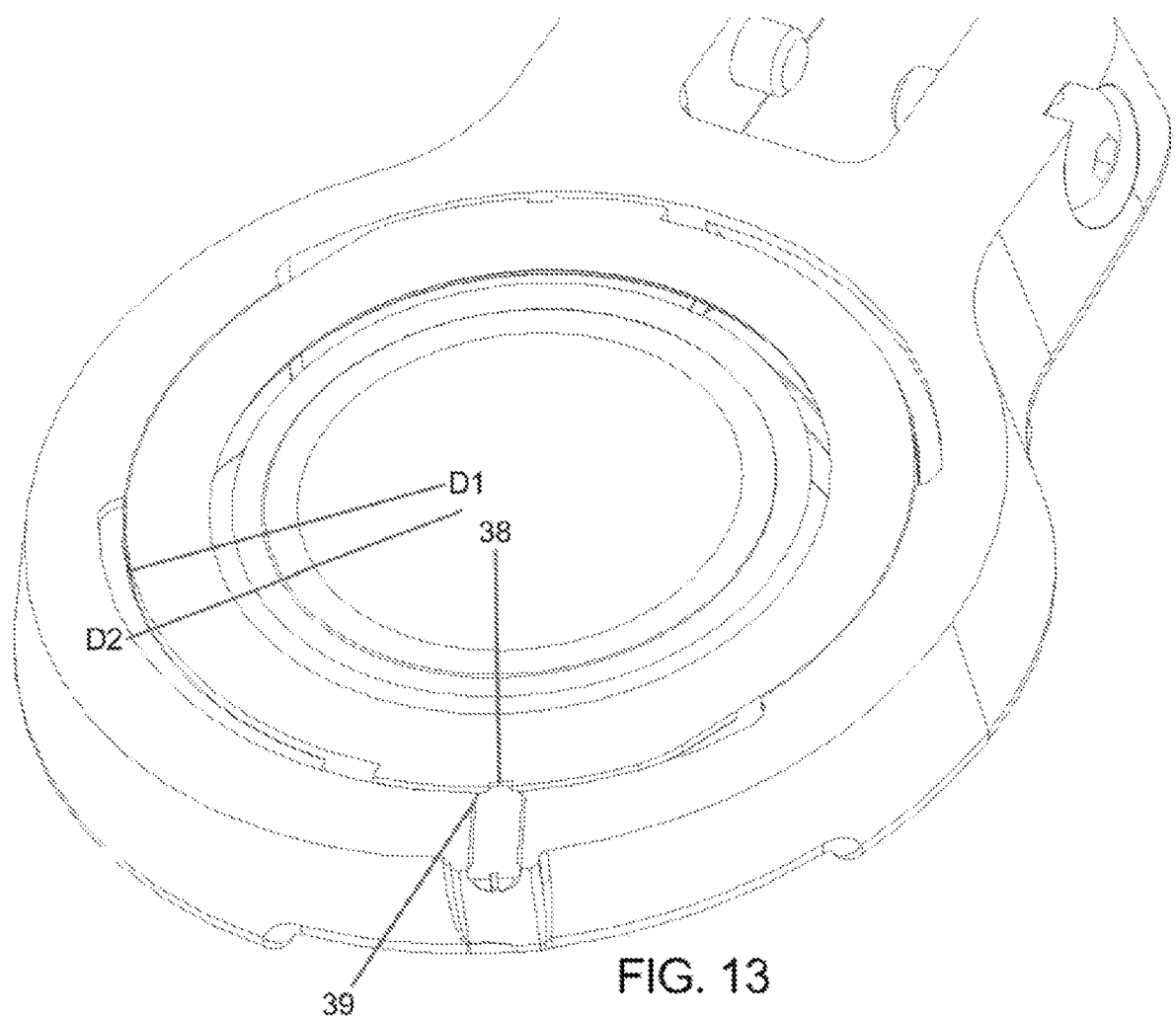
Figure 14:
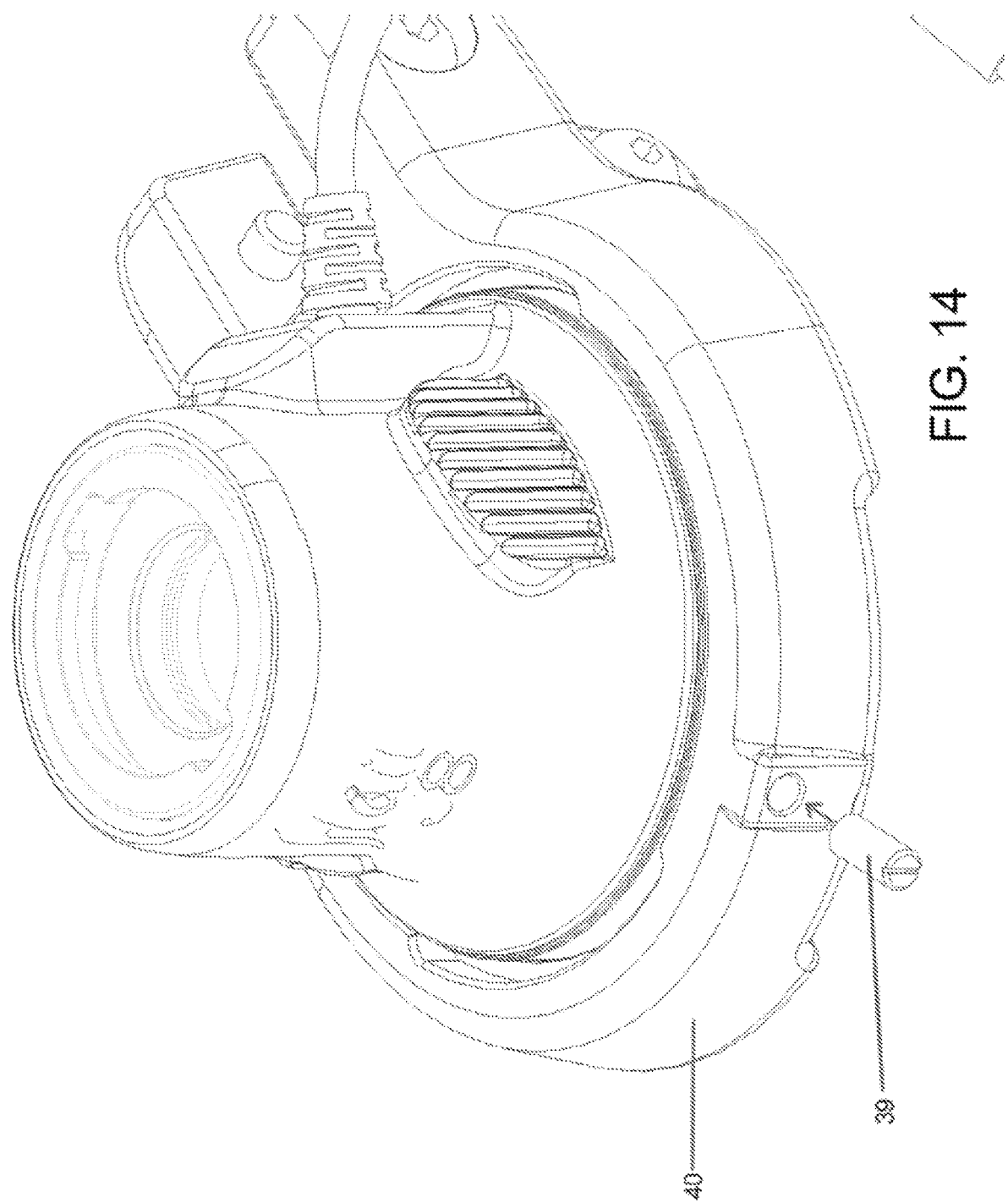
Figure 15:
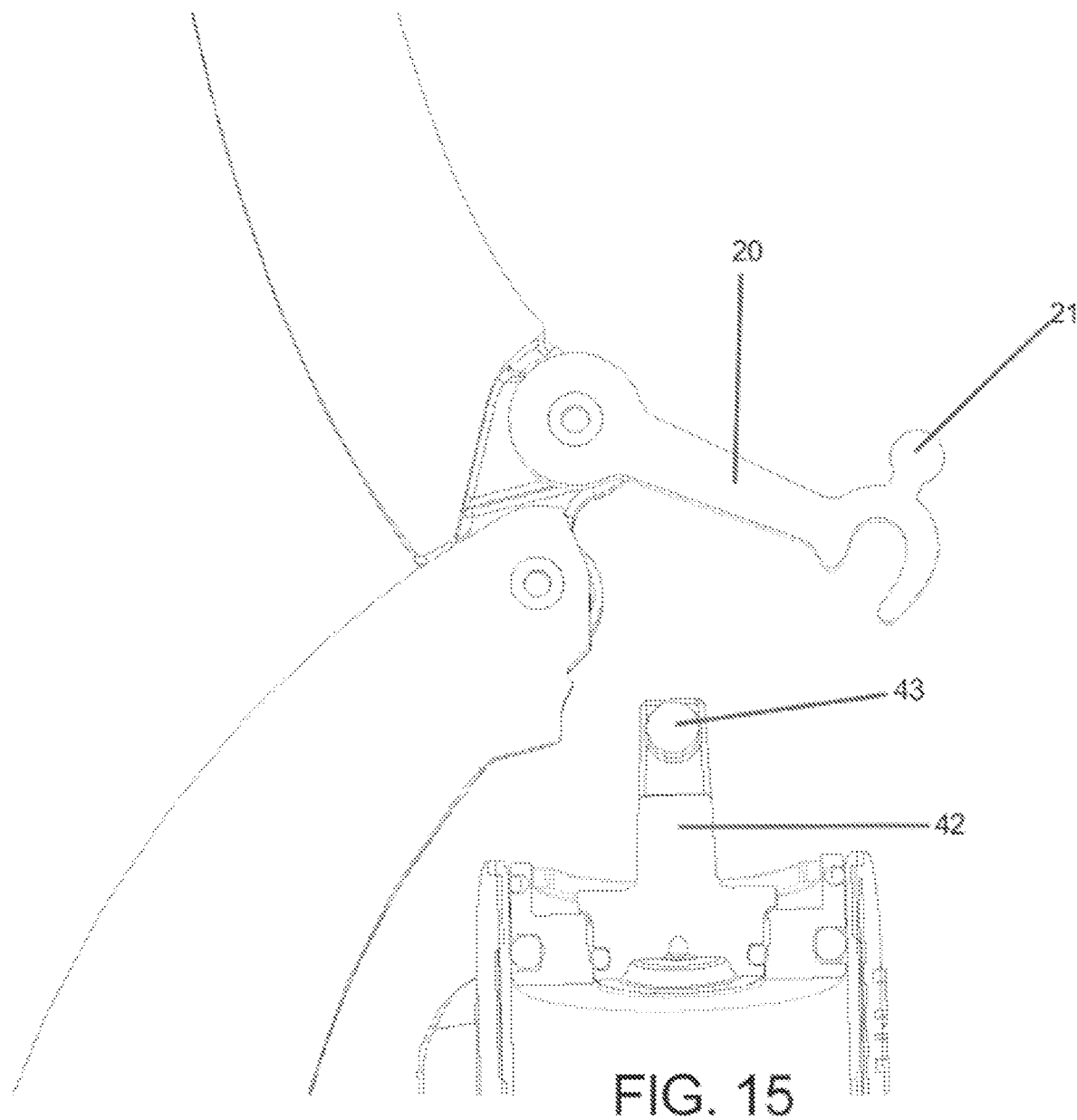
Figure 16:
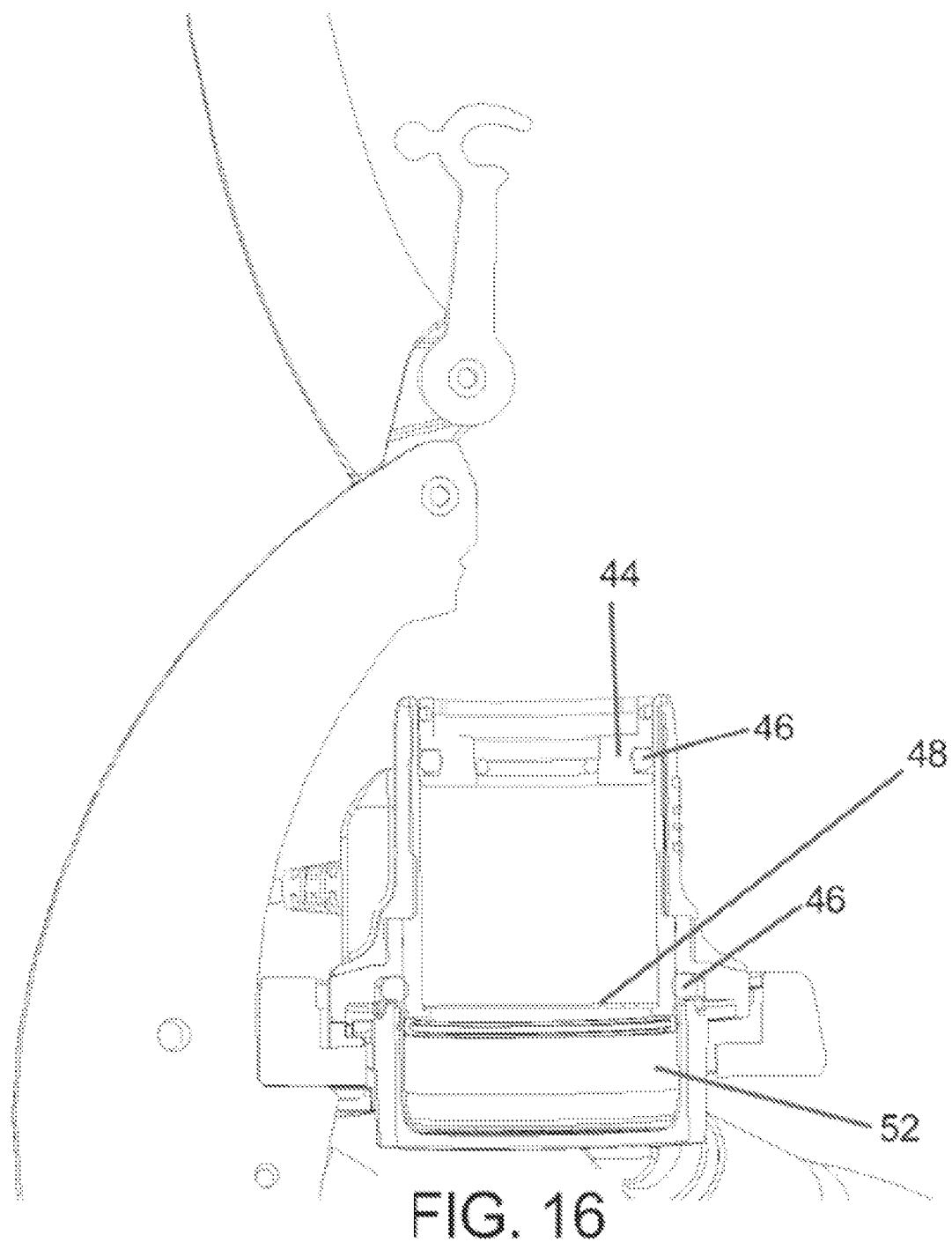
Figure 17:
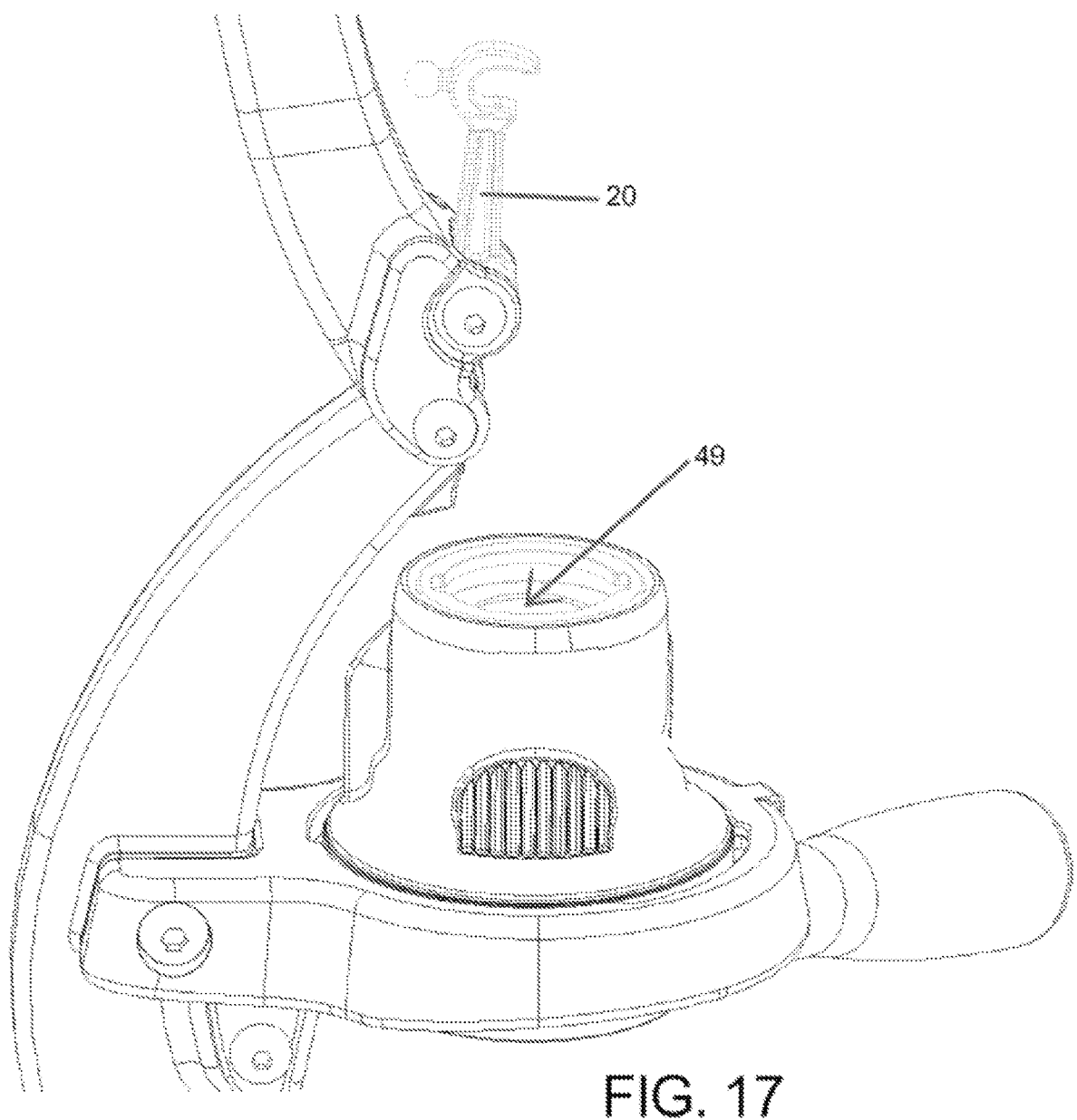
Figure 18:
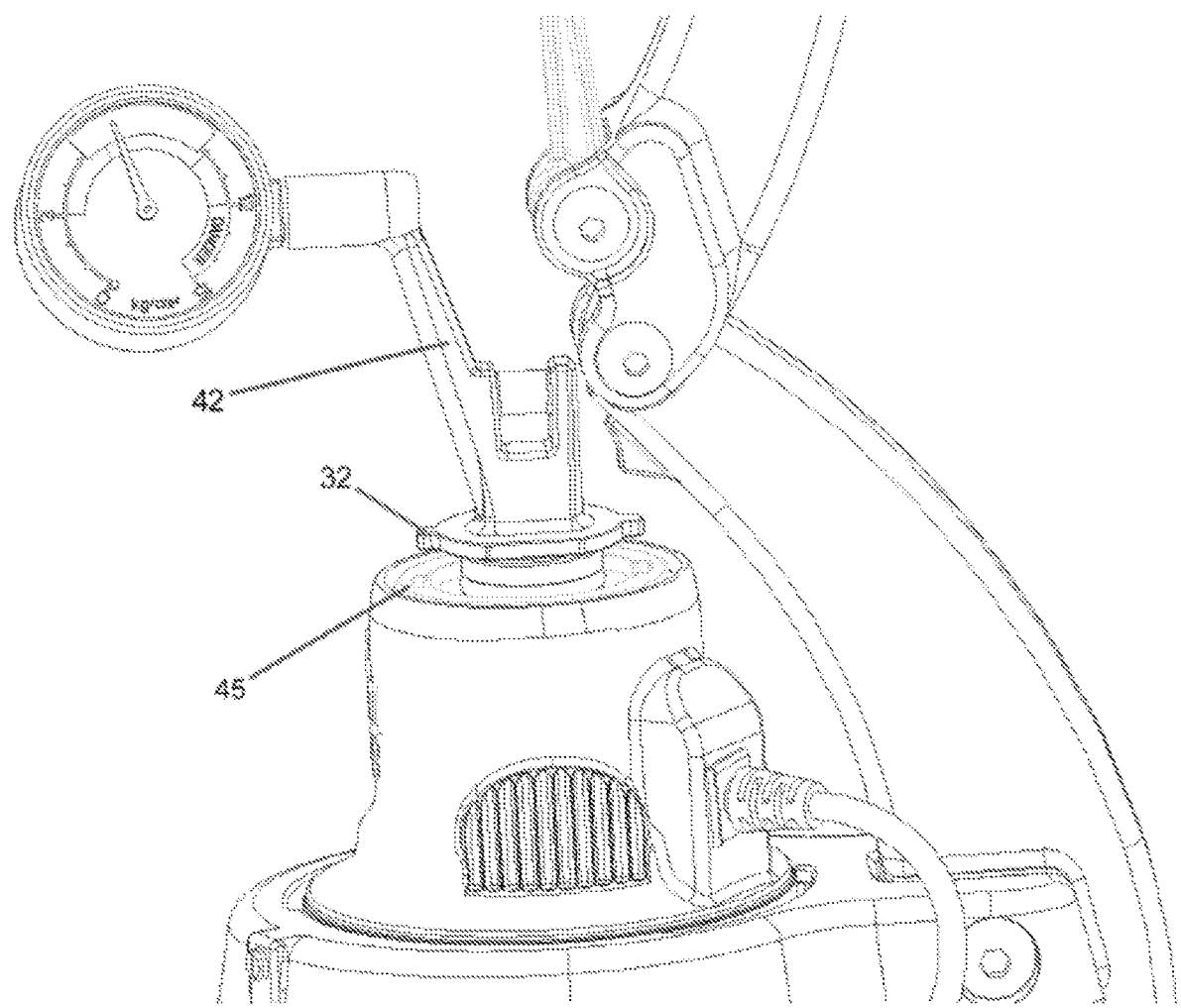
Figure 19:
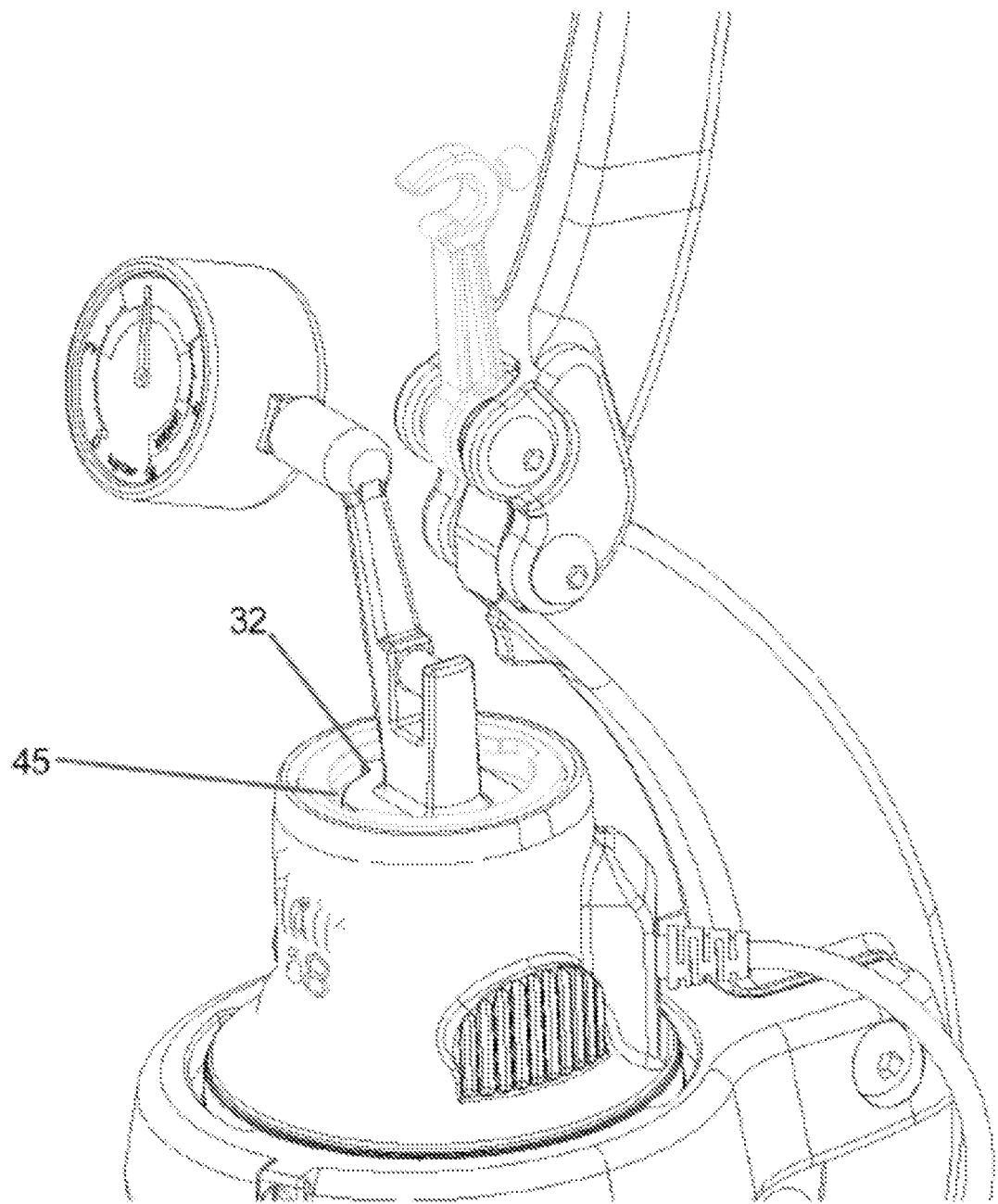
Figure 20:
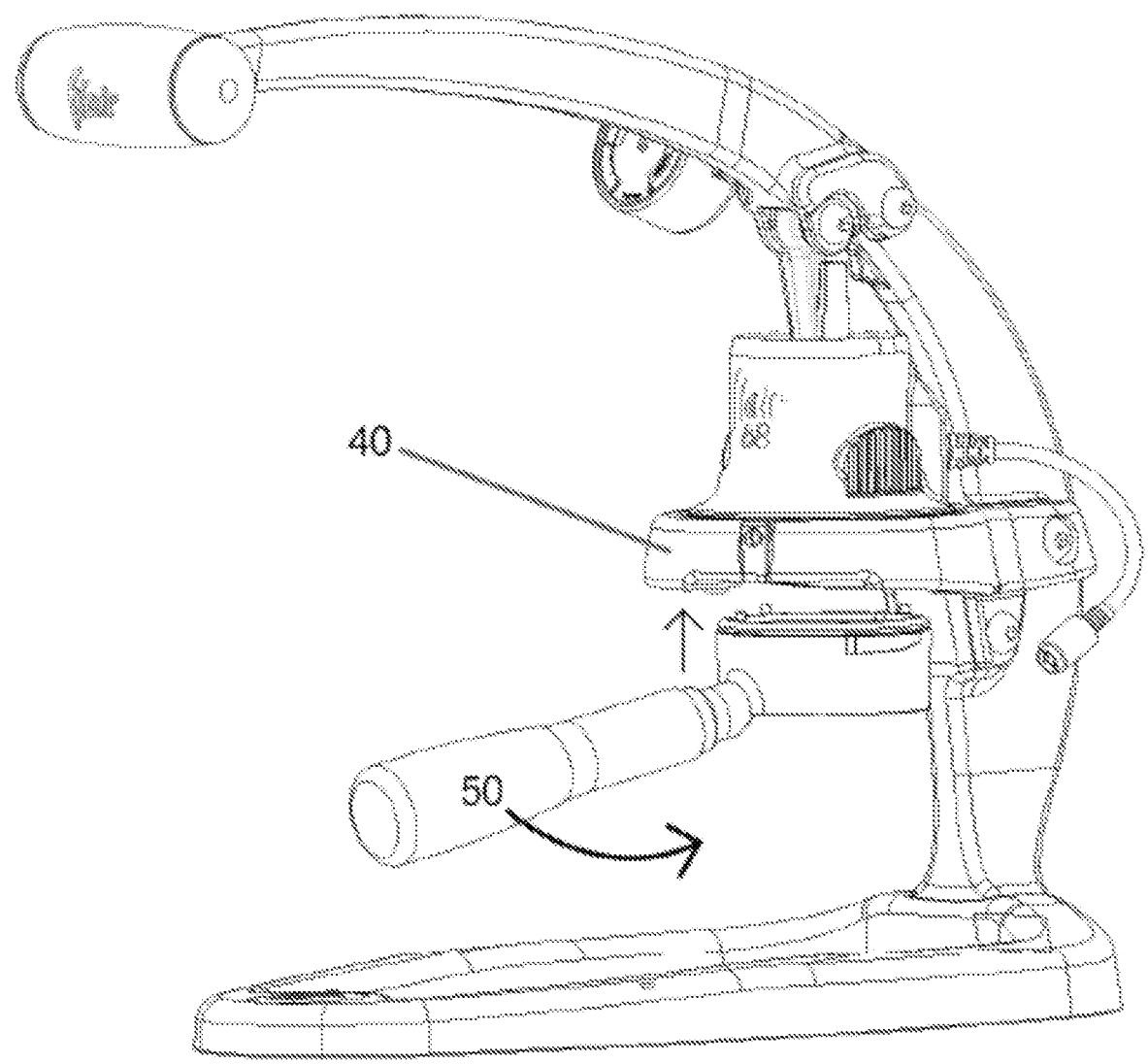
Figure 21:
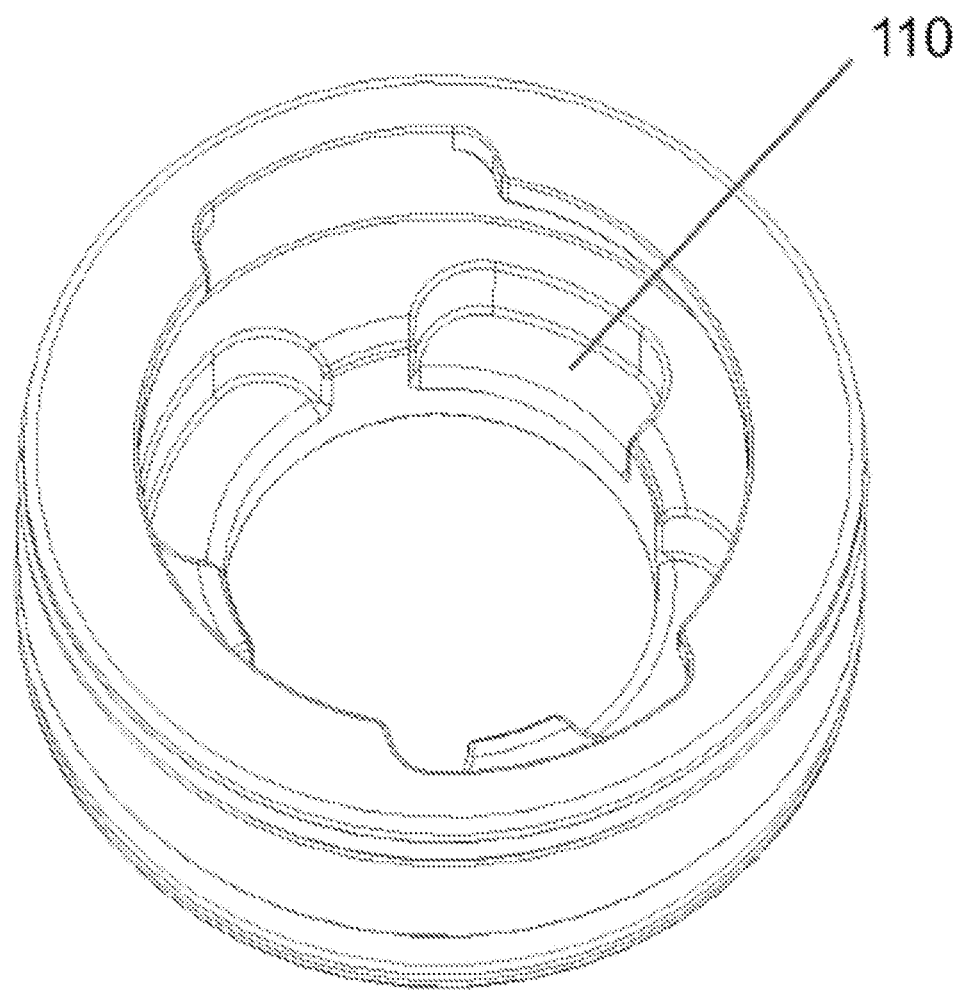
Figure 22:
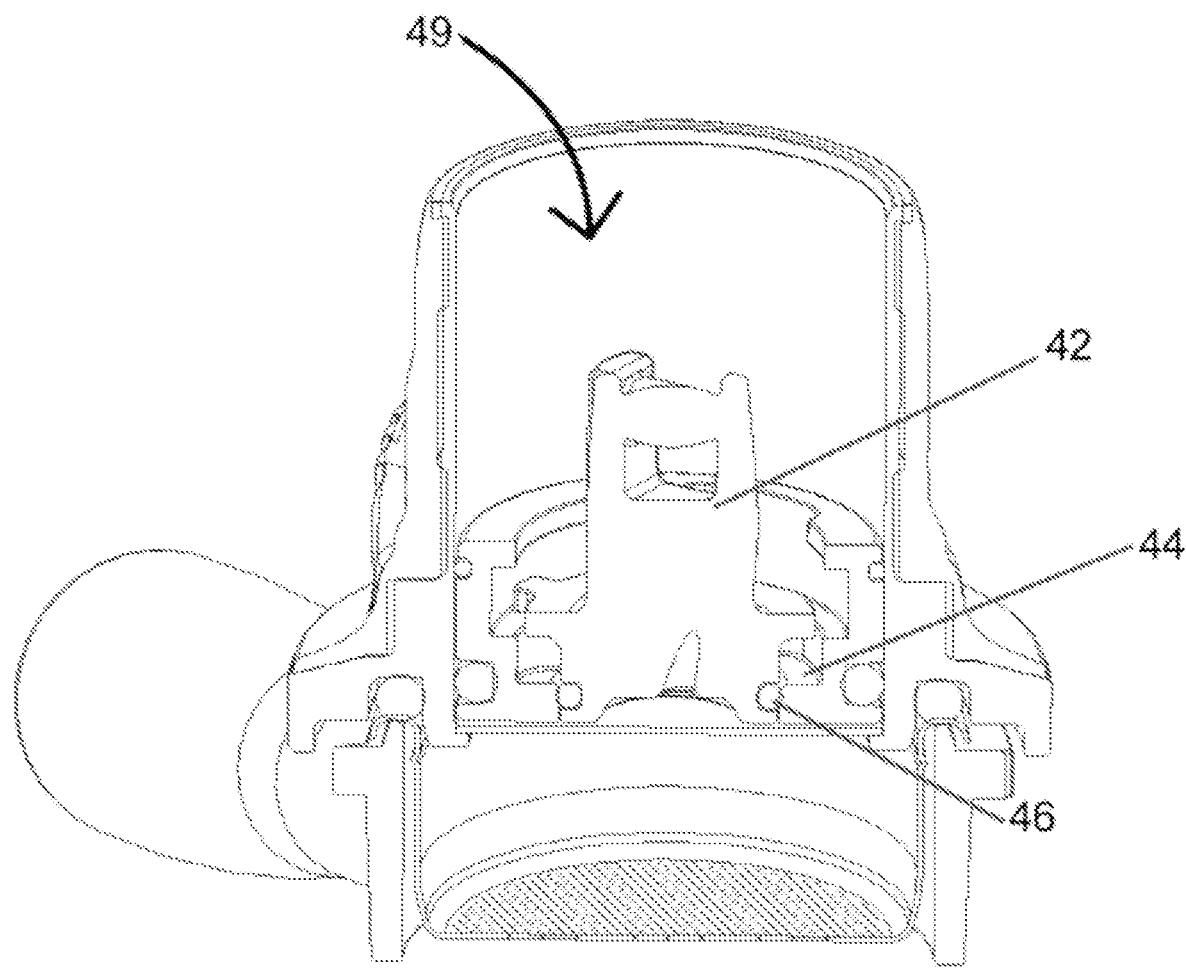
Figure 23:
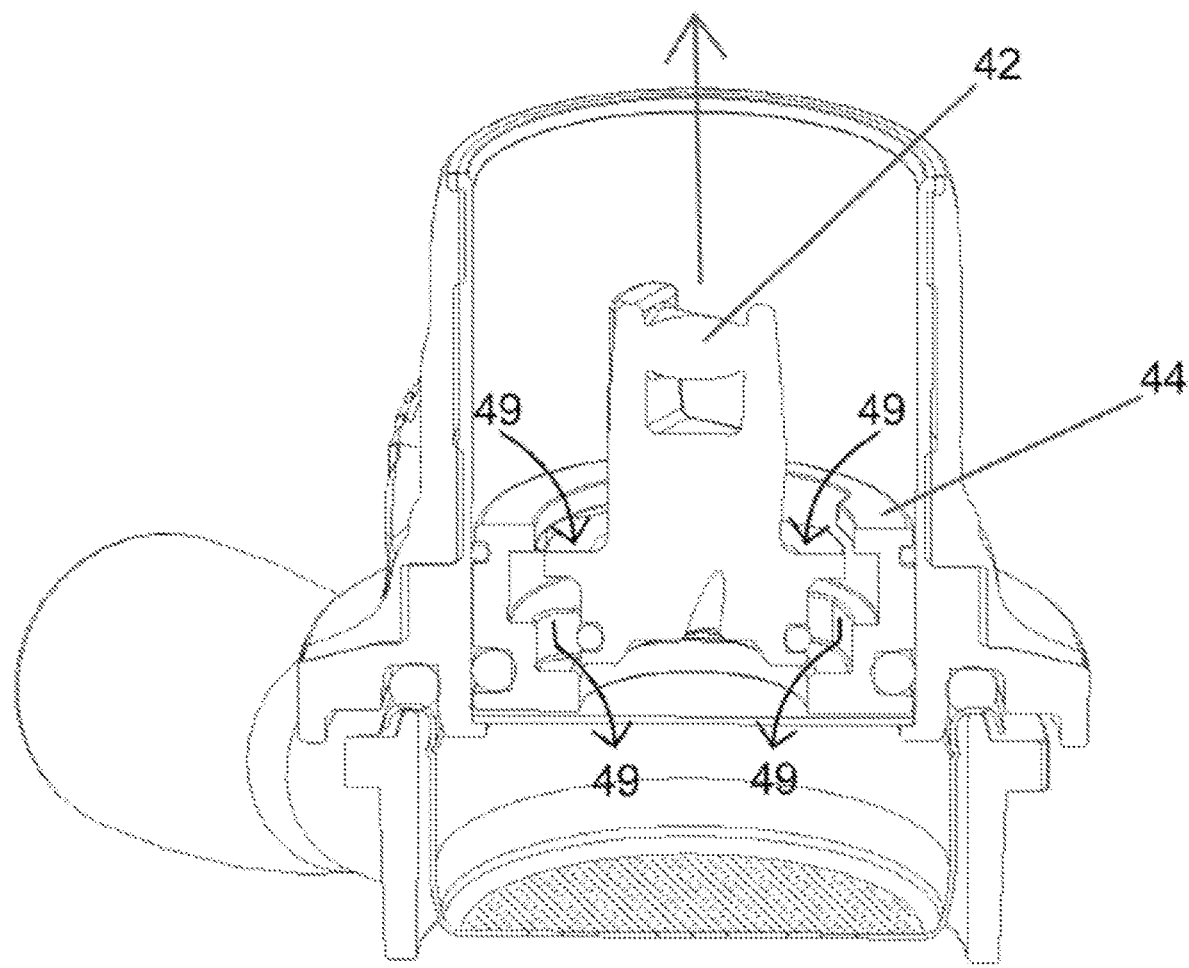
Figure 24:
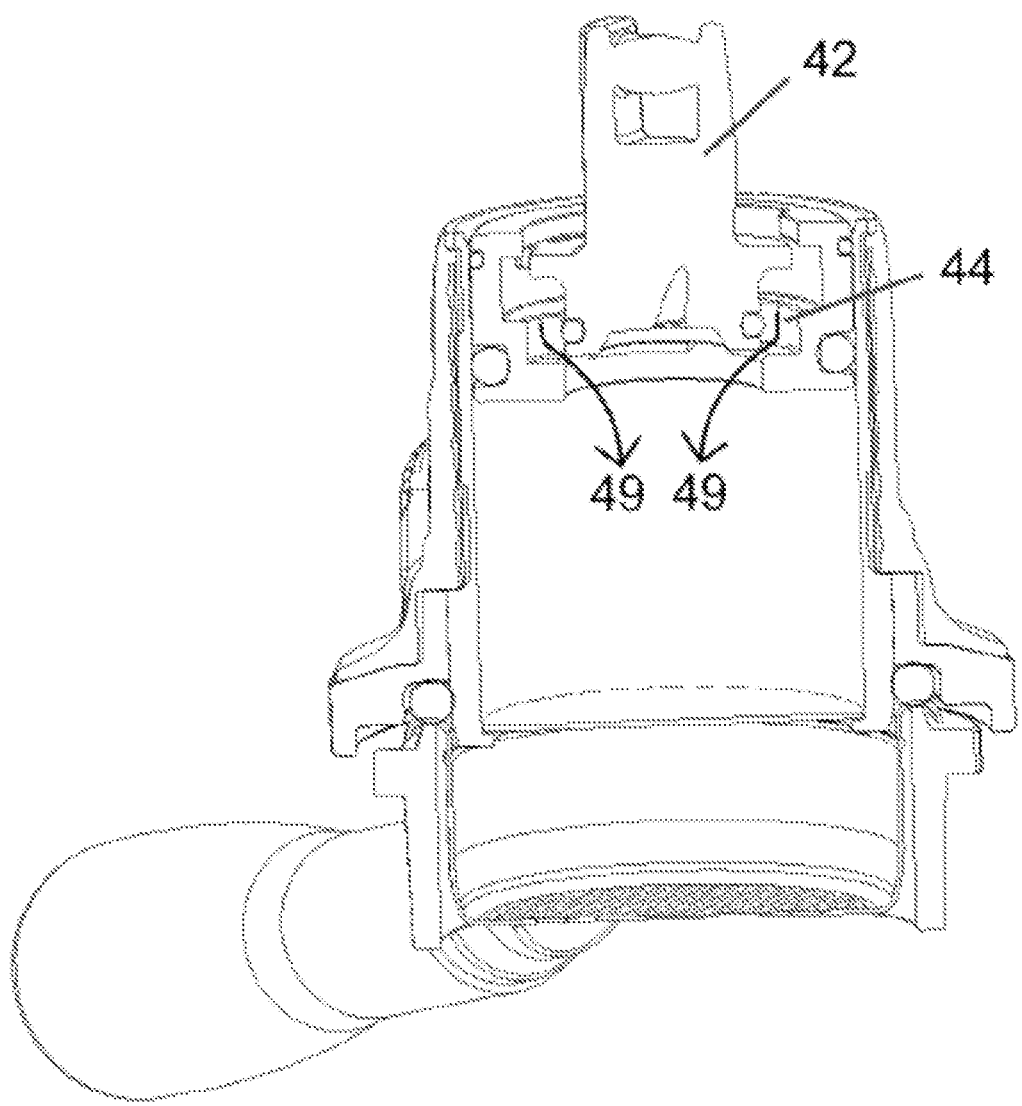
Figure 25:
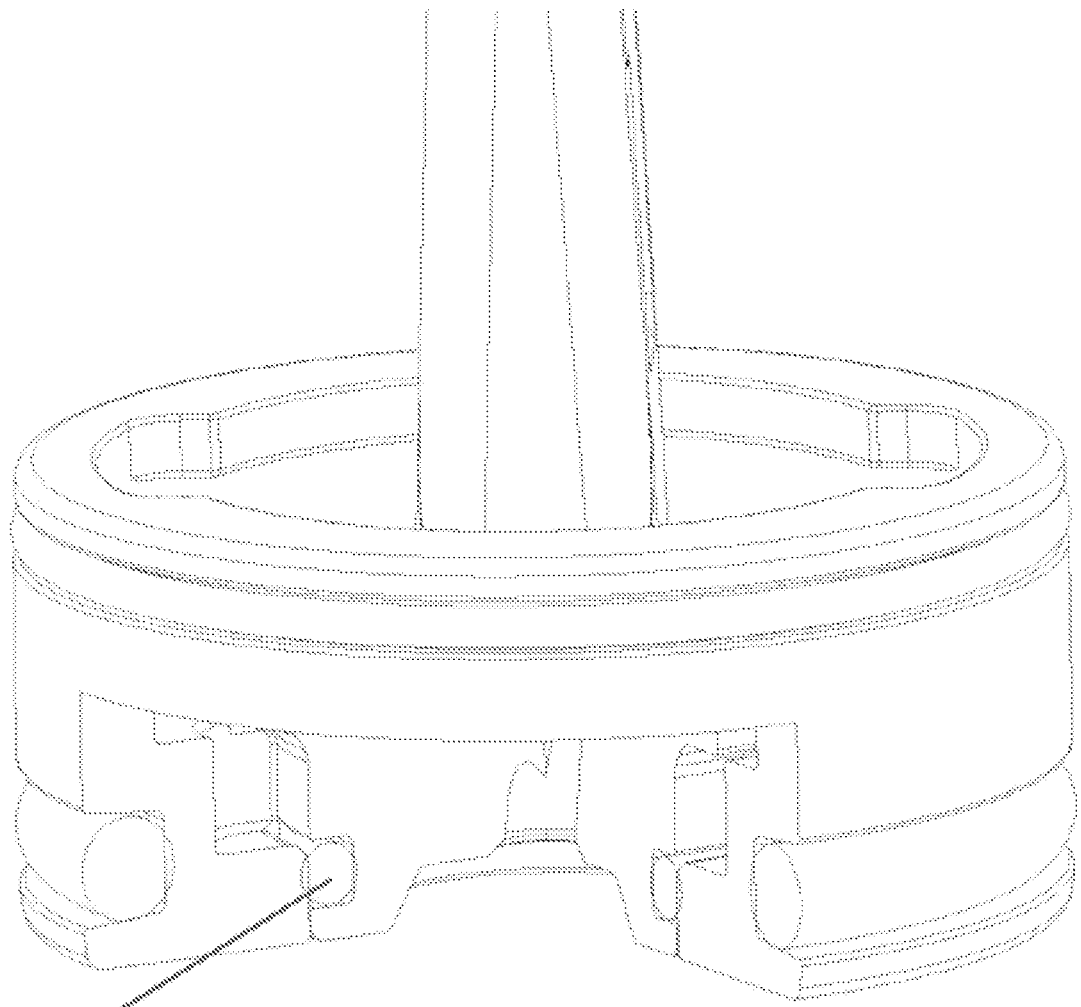

Having thus described examples of the disclosure in general terms, reference will now be made to the accompanying drawings, which are not necessarily drawn to scale, and wherein like reference characters designate the same or similar parts throughout the views. The particular objects and features of the instant disclosure as well as the advantages related hereto will become apparent from the following description taken in connection with the accompanying drawings, and wherein:

FIG. 1 is an illustration of a manual brewing press system according to an embodiment of the disclosure;

FIG. 2 is an illustration of a manual brewing press according to an embodiment of the disclosure;

FIG. 3 is an illustration of a cross sectional view of a brew head according to an embodiment of the disclosure;

FIG. 4 is an illustration of a cross sectional view of a brew head according to an embodiment of the disclosure;

FIG. 5 is an illustration of a manual brewing press according to an embodiment of the disclosure;

FIG. 6 is an illustration of a temperature control system for a manual brewing system such as in FIG. 1 according to an embodiment of the disclosure;

FIG. 7 is an illustration of a temperature control box of the temperature control system of FIG. 6 according to an embodiment of the disclosure;

FIG. 8 is an illustration of a temperature control box of the temperature control system of FIG. 6 according to an embodiment of the disclosure;

FIG. 9 is an illustration of a cross sectional view of a brew head according to an embodiment of the disclosure;

FIG. 10 is an illustration of a brew head being inserted into a press plate according to an embodiment of the disclosure;

FIG. 11 is an illustration of a brew head being locked into a press plate according to an embodiment of the disclosure;

FIG. 12 is an illustration of a brew head locked into a press plate according to an embodiment of the disclosure;

FIG. 13 is an illustration of a cross sectional view of the brew head depicted in FIG. 12 according to an embodiment of the disclosure;

FIG. 14 is an illustration of a brew head locked into a press plate and the spring set screw feature according to an embodiment of the disclosure;

FIG. 15 is a cross sectional view of a brew head before the lever is engaged to the stem of a piston according to an embodiment of the disclosure;

FIG. 16 is a cross sectional view of a brew head before the lever is engaged to the stem of a piston according to an embodiment of the disclosure;

FIG. 17 is an illustration of a brew head according to an embodiment of the disclosure;

FIG. 18 is an illustration of the engagement of the stem to the plunger of a piston in a brew head according to an embodiment of the disclosure;

FIG. 19 is an illustration of the engagement of the stem to the plunger of a piston in a brew head according to an embodiment of the disclosure;

FIG. 20 is an illustration of an attachment of the portafilter to the press plate of a manual brewing press according to an embodiment of the disclosure;

FIG. 21 is an illustration of a plunger of a piston in a brew head according to an embodiment of the disclosure;

FIG. 22 is an illustration of a cross section of a brew head when the elongated lever is in a lowest position according to an embodiment of the disclosure;

FIG. 23 is an illustration of a cross section of a brew head when the elongated lever has started to raise up according to an embodiment of the disclosure;

FIG. 24 is an illustration of a cross section of a brew head when the elongated lever is raised as high as possible according to an embodiment of the disclosure;

FIG. 25 is a closer cross sectional illustration of the plunger and stem shown in FIG. 22 according to an embodiment of the disclosure.

Figure 26:
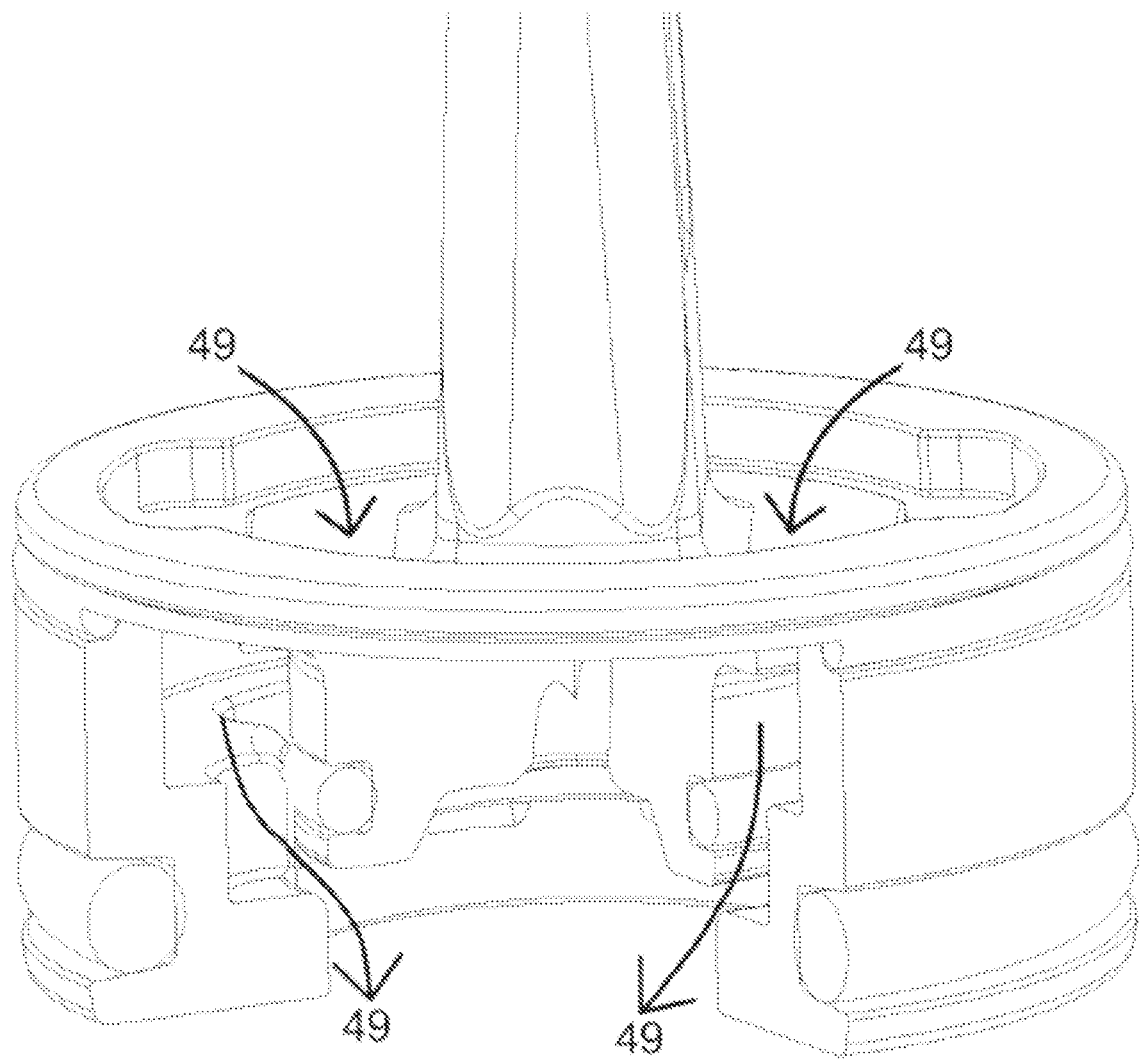

FIG. 26 is a closer cross sectional illustration of the plunger and stem shown in FIG. 23 according to an embodiment of the disclosure.

DETAILED DESCRIPTION OF THE INVENTION

The following description of the preferred embodiments of the disclosure is intended to enable someone skilled in the prior art to make and use the systems, devices, and methods but is not intended to limit the disclosure to these exemplary embodiments.

As an initial matter, it is customary in the industry for one of ordinary skill in the art to use the terms "brew head" or "brewing head" to indicate and include a main cylinder, a piston assembly with a plunger and a stem, and a portafilter in a brewing press. However, others of ordinary skill in the art have been known to use the term "brew head" when referring solely to the main cylinder and the plunger assembly pieces. In the latter case, the portafilter and piston stem are considered merely attachments to the brew head. As discussed herein, the term "brew head" will be used to refer to and include a main cylinder and a piston with a plunger and a stem. The portafilter will be discussed as a separate component rather than as part of the brew head given the portafilter's separate attachment to the brewing press device.

Referring now to the attached drawings, FIG. 1 illustrates a manual brewing press system 100 according to an embodiment of the disclosure. As shown, a lever assembly 5 includes an elongated lever 10 attached to a post 70 which attaches to a base 80 upon which the manual brewing press sits. A press plate 40 extends from the post 70 at a position above where the base 80 attaches to the post. A brew head 30 is configured to be inserted into a top of the press plate 40, and a portafilter 50 is removably attached to an underside of the press plate during brewing. A lever hook 20 is attached to the elongated lever 10 and will be used to facilitate the brewing process as described below.

Manual brewing press system 100 in FIG. 1 further includes a temperature control system that can be used to pre-heat the brew head. In an embodiment, the temperature control system may include a temperature control system with a temperature control box 60 electrically connected to a power supply 65. Not every embodiment of the disclosed manual brewing press includes a temperature control system attached thereto. FIGS. 2 thru 4 illustrate a manual brewing press 200 that does not have a temperature control system attached thereto (as shown). Various embodiments of a brewing press that include a temperature control system are further discussed below regarding FIGS. 5 thru 9.

FIGS. 2 thru 4 illustrate manual brewing press 200 according to an embodiment of the disclosure. FIG. 2 illustrates a side view of manual brewing press 200 and FIGS. 3 and 4 illustrate a cross-sectional view of the brewing press and the brew head in particular. Brew head 30 includes a cylinder 35 and a piston assembly 37 having a plunger 44 disposed within the cylinder and a stem 42, also referred to herein as a plunger and plunger stem, respectively. A pressure gauge 75 is integrated into the plunger stem 42 and is positioned outside of the brew head 30.

FIGS. 3 and 4 illustrate an embodiment of the brewing press when the lever hook 20 of the elongated lever 10 is engaged to the stem 42 of the piston. When in an engaged position, the lever hook 20 is configured to move the plunger 44 down and up inside the cylinder when a user lowers and raises the elongated lever 10 respectively. When the user lowers the elongated lever, the plunger 44 compresses water 49 inside the cylinder and pushes the compressed water down through coffee grounds 54 disposed in a portafilter basket 52 inside the portafilter 50 and into a drinking vessel 53 positioned below the portafilter. In an embodiment, the brewed liquid that exits the portafilter is hot espresso 59. In another embodiment, the grounds 54 may be comprised of tea leaves or other non-coffee grounds used for brewing a beverage, as per the preference of the user. In an embodiment, a dispersion screen 48 is positioned above the coffee grounds in the portafilter. In various embodiments, the dispersion screen can be made of steel.

Pressure gauge 75 integrated into stem 42 is configured to indicate an amount of pressure that the water is exerting inside the cylinder during brewing as the user manually lowers the elongated lever 10.

In various embodiments, after lowering the elongated lever, the user raises the elongated lever 10 which pulls the piston 37 back up to prompt the brew head for a subsequent brewing.

In an embodiment, the plunger assembly 44 comprises at least one resilient sealing ring 46 disposed therearound. As shown in FIG. 3, a resilient sealing element 46 provides a seal between the plunger 44 and the cylinder 35 when the lever hook 20 is engaged to the plunger stem 42 and a user lowers and raises the elongated lever 10. In an embodiment, the resilient sealing element 46 may be a resilient sealing ring.

After the user has finished using the manual brew press, the user can disengage the lever hook from the stem of the piston to remove the brew head from the top of the press plate for cleaning or for preheating. In various embodiments illustrated in at least FIGS. 3, 4, and 15, lever hook 20 may have a spherical knob 21 on it that makes it easy for a user to engage and disengage the lever hook from the stem of the piston. In an embodiment, the lever hook 20 has a flattened semi-circle handle (not shown) instead of a spherical knob on it that makes it easy for a user to engage and disengage the lever hook from the stem of the piston. In an embodiment of the disclosure, the stem of the piston may be hollow inside.

Referring now at FIG. 5, an embodiment of manual brewing press 200 as illustrated in FIGS. 2 thru 4 is depicted including a temperature control system. The temperature control system includes an electric heating element 62 in contact with the outside surface of cylinder 35, at least one temperature sensor 66 attached to the cylinder, and a temperature control box 60. The electric heating element 62 is positioned and configured to heat the brew head. In an embodiment, the electric heating element may be strapped around the cylinder.

As shown in FIGS. 6 thru 8, the temperature control box 60 includes an input side electrically connected to a power supply 65 via a connector 67 and an output side electrically connected to the electric heating element 62 via wires 64 and the temperature sensor 66 via various wires 66a and 66b. The temperature control box 60 is configured to receive temperature readings from the temperature sensor 66 and to allow the electric heating element 62 to heat the brew head until it reaches a preset temperature set by the user on the temperature control box. The temperature control box also functions to control the electric heating element in order to maintain the preset temperature after it has been reached until the user turns off the power supply to the temperature control box.

As illustrated by FIGS. 7 and 8, temperature control box 60 may include at least one on/off press button 63 and a plurality of indicating lights 69a, 69b, and 69c. In an embodiment, each of the indicating lights represents a corresponding preset heat level chosen by the user. In another embodiment, the preset heat levels corresponding to the indicating lights are set by the manufacturer. In yet another embodiment, the plurality of indicating lights may correlate to a user or manufacturer setting for a low temperature indicator light 69a, a medium temperature indicator light 69b, and a high temperature indicator light 69c. In an embodiment, the preset heat levels may correlate to an ideal temperature for various types of brew as would be known by one in ordinary skill in the art.

Referring to FIG. 9, an embodiment of the disclosure includes a brewing press with a temperature control system that includes a thermal insulation sleeve 90 disposed around the electric heating element 62 and the cylinder 35. In an embodiment, the thermal insulation sleeve 90 may be made of silicone, a silicone rubber, a silicone polymer, or polymer blends with silicone containing polymers.

FIGS. 10 thru 14 illustrate how to insert the brew head 30 into a top of the press plate 40. In an embodiment shown in FIG. 13, the top of the press plate 40 comprises an inside diameter that is larger than an outside diameter of the brew head 30.

Referring to FIG. 10, at least one locking tab 32 disposed on a side bottom of the brew head is configured to fit into and be inserted into at least one corresponding open slot 41 disposed in the top of the press plate. Thus, a user inserts the brew head into the top of the press plate by aligning the locking tab on the brew head with the corresponding open slot, lowering the brew head onto the press plate, and then rotating the brew head in a counterclockwise direction to secure it into the top of the press plate, as illustrated in FIG. 11.

In an embodiment, the press plate comprises a spring set screw 39 to lock the brew head into place. FIG. 12 illustrates the spring set screw when the brew head is in a locked position in the top of the press plate. FIG. 13 illustrates a cross sectional view of FIG. 12, showing the spring set screw 39 of the press plate 40. Also shown, is a steel ball tip 38 disposed on a bottom side of the brew head that retracts against a spring (not shown) of the spring set screw 39 in the press plate to lock the brew head into the press plate.

FIG. 14 illustrates a view of the brew head inserted into the press plate and, purely for purposes of illustration, depicts the set screw of the spring set screw 39 in an exploded view configuration before the set screw is threaded into the press plate.

FIG. 15 provides a close-up illustration of the lever hook 20 before it is engaged to the plunger stem 42. In an embodiment, lever hook 20 can be engaged to the stem of the piston by swinging the lever hook 20 around a horizontal post 43 on the stem. FIG. 16 illustrates a cross-sectional view of the brewing press having the lever hook 20 in a disengaged position, prior to the lever hook engaging to the plunger stem 42.

In various embodiments, a method of making a beverage using the manual brewing press is disclosed. In an embodiment, a user will insert the brew head into the press plate as discussed above in regards to FIGS. 10 thru 14, securing it into place using the locking tab and corresponding slot configuration, and locking the brew head into the press plate using the spring set screw. A user will then attach the portafilter comprising coffee grounds to an underside of the press plate, as shown in FIG. 20. The user positions the portafilter below the press plate, raises the portafilter upwards against an underside of the press plate, and then turns the portafilter counterclockwise to lock it into the press plate.

The user then pours water into the cylinder of the brew head as illustrated in FIG. 17. In various embodiments, the user may have previously disengaged the stem of the piston from the plunger of the piston to make adding the water faster or easier. In this situation, the user will then re-engage the stem of the piston with the plunger of the piston by inserting at least one tab disposed on a side and bottom of the stem into at least one corresponding open slot disposed on a top of the plunger and rotating the stem after insertion of the at least one tab into the at least one corresponding open slot of the plunger.

FIG. 18 illustrates a proper alignment and insertion of the at least one tab 32 on the stem into the corresponding at least one slot 45 on the plunger. FIG. 19 illustrates a proper alignment of the stem into the plunger after the at least one tab 32 on the stem is inserted into the at least one slot 45 of the plunger and the stem is rotated.

After properly engaging the stem to the plunger, the user will next engage the lever hook to the stem and lower the elongated lever in order to push the hot water through the portafilter and into a vessel placed below. After an amount of brewed liquid (e.g. espresso) fills the drinking vessel below, the user can raise the elongated lever and prompt a subsequent brewing.

In various embodiments of the manual brewing press system including the temperature control system, the user may pre-heat the water in the brew head using the temperature control box to preset a temperature for the electric heating element positioned around the cylinder of the brew head. In an embodiment of the method, the preheating operation can be performed after engaging the stem of the piston to the plunger, but before the user engages the lever hook and lowers the elongated lever. In another embodiment, the preheating step can be performed prior to engaging the stem of the piston to the plunger of the piston, and prior to engaging the lever hook and lowering the elongated lever.

In an embodiment, the user may add water to the cylinder and maintain a steady temperature of the water at the preset temperature the user selects using the temperature control box.

In an embodiment of the disclosure, at least one resilient sealing element may be a resilient sealing ring disposed around at least one of the plunger and the stem to provide a watertight seal at an engagement between the plunger and the stem.

Referring now to FIG. 21, an embodiment of the plunger of the piston is illustrated. As shown, a top of the plunger may comprise at least one bypass slot 110. Bypass slot 110 allows the resilient sealing ring or rings disposed around the plunger and/or the stem to act as a valve.

As shown in FIGS. 22 thru 26, water 49 is poured into the top of the cylinder of the brew head. At the position shown in FIG. 22, resilient sealing ring 46 provides a watertight seal at the engagement between the plunger 44 and the stem 42 when the stem 42 is pressed against the top of the plunger 44 and when the elongated lever is pulled all the way down by a user. FIG. 23 illustrates the watertight seal between the stem 42 and plunger 44 being broken when the elongated lever is pulled up as indicated by the arrow. Once the watertight seal between the stem and the plunger is broken water 49 is able to flow through the bypass slots in the plunger as indicated by the downward arrows.

Thus, when the user presses the elongated lever, stem, and plunger to a lowest position as shown in FIG. 23, a watertight seal is created by the resilient sealing rings 46, and the user is able to fill the cylinder with water at a top of the cylinder in the brew head. When the user pulls up on the elongated lever as shown in FIG. 23, the stem and plunger are pulled back up causing the watertight seal at the engagement between the plunger and the stem to be broken, and causing the water filled inside the cylinder to fall by gravity through the plunger via the bypass slots, prompting the brew head for a subsequent brewing. FIG. 24 illustrates the highest position of the stem and plunger when the elongated lever has been lifted as high as it can go. As seen here, water (if any is still above the plunger) is still able to flow downward and through any bypass slots in the plunger. At this point, all the water is below the plunger and on top of the coffee grounds in the portafilter.

When the user lowers the elongated lever again, the water is compressed and pushed through the coffee grounds and into a cup or other drinking vessel placed under the portafilter.

In an embodiment of the disclosure, the stem moves approximately 5 mm up and down along the internal recess of the plunger. FIG. 22 illustrates the lowest position of the stem in plunger, and FIG. 23 illustrates the highest position of the stem in the plunger.

Referring now to FIG. 25, an alternate view of the lowest position of the stem and plunger illustrated in FIG. 22 is shown. FIG. 26 provides a close-up view of the stem shown in FIG. 24 when it is in the highest position in the recess of the plunger and water is able to flow downward through the bypass slots in the plunger.

Many modifications and other examples of the disclosure set forth herein will come to mind to one of ordinary skill in the art to which the disclosure pertains having the benefit of the teachings presented in the foregoing descriptions and the associated drawings.

The invention claimed is:

1. A manual brewing press comprising:
   a lever assembly comprising a post, a press plate extending from the post, an elongated lever, and a lever hook attached to the elongated lever;
   a base attached to the post of the lever assembly at a position lower than the press plate and the elongated lever;
   a brew head configured to be inserted into a top of the press plate, the brew head comprising a cylinder and a piston, wherein the piston comprises a plunger disposed inside the cylinder and a stem disposed on a top of the plunger and integrating a pressure gauge; and a portafilter configured to attach to an underside of the press plate, wherein the lever hook of the elongated lever is configured to engage to the stem, wherein, at an engaged position, the lever hook is configured to move the stem and plunger down and up inside the cylinder as the elongated lever is moved down and up, respectively pushing water inside the cylinder down through coffee grounds in the portafilter when the elongated lever is lowered, and pulling the stem and plunger back up when the elongated lever is raised to prompt the brew head for a subsequent brewing, wherein at least one resilient sealing element is disposed adjacent to at least one of the plunger and the stem, wherein the lever hook is configured to disengage from the stem to allow a user to easily remove the brew head from the top of the press plate for cleaning, and wherein the stem integrating the pressure gauge is configured to disengage from the plunger when the user rotates the stem by less than 180 degrees to allow removal from the brew head for easier or faster filling of the cylinder with the water and cleaning of an inside of the brew head.

2. The manual brewing press as in claim 1, wherein the stem comprises at least one tab disposed on a side and bottom of the stem, and wherein the plunger comprises at least one open slot disposed on a top of the plunger and configured to receive the at least one tab of the stem when the stem is inserted into and engaged to the top of the plunger.

3. The manual brewing press as in claim 1, wherein the press plate comprises an inside diameter that is larger than an outside diameter of the brew head, and wherein the brew head is configured to lock into the top of the press plate by rotation after at least one locking tab disposed on a side of the brew head is inserted into at least one corresponding open slot disposed in the top of the press plate.

4. The manual press as in claim 3, wherein the press plate comprises a spring set screw configured such that a steel ball tip on the brew head retracts against a spring of the spring set screw to lock the brew head into the press plate.

5. The manual brewing press as in claim 1, wherein the at least one resilient sealing element is a sealing ring disposed around at least one of the plunger and the stem to provide a watertight seal at an engagement between the plunger and the stem.

6. The manual brewing press as in claim 5, wherein the pressure gauge is configured to indicate an amount of pressure that the water is exerting inside the cylinder during brewing as the user exerts manual force to lower the elongated lever.

7. A manual brewing press comprising:

a lever assembly comprising a post, a press plate extending from the post, an elongated lever, and a lever hook attached to the elongated lever;

a base attached to the post of the lever assembly at a position lower than the press plate and the elongated lever;

a brew head configured to be inserted into a top of the press plate, the brew head comprising a cylinder, a piston, and an electric heating element in contact with an outside surface of the cylinder and configured to heat the brew head, wherein the piston comprises a plunger disposed inside the cylinder and a stem disposed on a top of the plunger and integrating a pressure gauge; and a portafilter configured to attach to an underside of the press plate, wherein the lever hook of the elongated lever is configured to engage to the stem, wherein, at an engaged position, the lever hook is configured to move the stem and plunger down and up inside the cylinder as the elongated lever is moved down and up, respectively pushing water inside the cylinder down through coffee grounds in the portafilter when the elongated lever is lowered, and pulling the plunger back up when the elongated lever is raised to prompt the brew head for a subsequent brewing, wherein at least one resilient sealing element is disposed adjacent to at least one of the plunger and the stem to provide a watertight seal at an engagement between the plunger and the stem, and wherein the lever hook is configured to disengage from the stem of the piston to allow a user to easily remove the brew head from a top of the press plate for cleaning, wherein the stem integrating the pressure gauge is configured to disengage from the plunger when the user rotates the stem by less than 180 degrees to allow removal from the brew head for easier or faster filling of the cylinder with the water and cleaning of an inside of the brew head.

8. The manual brewing press as in claim 7, further comprising a temperature control system including a temperature sensor attached to the cylinder and a temperature control box with an input side electrically connected to a power supply and an output side electrically connected to the electric heating element and the temperature sensor, wherein the temperature control box is configured to receive temperature readings from the temperature sensor and allow the electric heating element to continue to heat the brew head until it reaches a preset temperature of the brew head set by the user on the temperature control box, and wherein once the preset temperature is achieved, the temperature control box is configured to maintain the preset temperature until the user turns off the power supply to the temperature control box.

9. The manual brewing press as in claim 8, wherein temperature control box comprises at least one button and a plurality of indicating lights, and wherein an each of the plurality of indicating lights represents a corresponding preset heat level chosen by the user.

10. The manual brewing press as in claim 7, wherein the press plate comprises an inside diameter that is larger than an outside diameter of the brew head, and wherein the brew head is configured to lock into the top of the press plate by rotation after at least one locking tab disposed on a side of the brew head is inserted into at least one corresponding open slot disposed in the top of the press plate.

11. The manual press as in claim 10, wherein the press plate comprises a spring set screw configured such that a steel ball tip on the brew head retracts against a spring of the spring set screw to lock the brew head into the press plate.

12. The manual brewing press as in claim 7, wherein the at least one of the plunger and the stem comprises at least one bypass slot configured to allow the at least one resilient sealing element to act as a valve, providing a watertight seal on the engagement between the plunger and the stem when the stem is pressed against the top of the plunger as the elongated lever is pulled down by the user, and breaking the watertight seal between the stem and the plunger as the elongated lever is pulled up, releasing pressure of the stem against the plunger, and allowing water to flow through the at least one bypass slot,
- wherein, when the user presses the elongated lever, stem, and plunger to a lowest position, a watertight seal is created at the lowest position, and the user is able to fill the cylinder with water at a top of the cylinder in the brew head, and
- wherein, when the user pulls up on the elongated lever, the stem and plunger are pulled back up causing the watertight seal at the engagement between the plunger and the stem to be broken, and causing the water filled inside the cylinder to fall by gravity through the plunger, prompting the brew head for a subsequent brewing.

13. The manual brewing press as in claim 12, wherein the pressure gauge is configured to indicate an amount of pressure that the water is exerting inside the cylinder during brewing as the user exerts manual force to lower the elongated lever.

14. A method of making a beverage using a manual brewing press, the method comprising:
- attaching a portafilter comprising coffee grounds to an underside of a press plate extending from a post of a lever assembly that is attached to a base;
- pouring water into a cylinder disposed in a brew head, wherein the brew head is removably inserted into a top of the press plate and the brew head comprises a piston,
- wherein the piston comprises a plunger disposed inside the cylinder and a stem integrating a pressure gauge, and
- wherein at least one resilient sealing element is disposed adjacent to at least one of the plunger and the stem to provide a watertight seal at the engagement of the plunger and the stem;
- engaging a lever hook attached to an elongated lever of the lever assembly to the stem of the piston by swinging the lever hook around a horizontal post on the stem;
- lowering the elongated lever, when the lever hook is in an engaged position, by applying a downward pressure on the elongated lever, wherein the lowering of the elongated lever causes the plunger of the piston to move down inside the cylinder and pushes the water inside the cylinder down through the coffee grounds in the portafilter and into a drinking vessel disposed thereunder; and
- raising the elongated lever back up by applying an upward pressure on the elongated lever which pulls the plunger of the piston back up inside the cylinder and prompts the brew head for a subsequent brewing.

15. The method of making a beverage using the manual brewing press as in claim 14, further comprising
- inserting at least one locking tab disposed on a side of the brew head into at least one corresponding open slot disposed in the top of the press plate,
- wherein the top of press plate comprises an inside diameter that is larger than an outside diameter of the brew head to accommodate the insertion of the at least one locking tab into the at least one corresponding open slot, and
- wherein the press plate comprises a spring set screw configured such that a steel ball tip on the brew head retracts against a spring of the spring set screw to lock the brew head into the press plate.

16. The method of making a beverage using the manual brewing press as in claim 15, further comprising
- engaging the stem of the piston with the plunger of the piston by inserting at least one tab disposed on a side and bottom of the stem into at least one corresponding open slot disposed on a top of the plunger and rotating the stem after insertion of the at least one tab into the at least one corresponding open slot of the plunger.

17. The method of making a beverage using the manual brewing press as in claim 16, wherein the at least one of the plunger and the stem comprising the at least one resilient sealing element is configured to act as a valve, providing the watertight seal at the engagement of the plunger and the stem when the stem is pressed against the top of the plunger as the elongated lever is pulled down by the user, and breaking the watertight seal between the stem and the plunger as the elongated lever is pulled up, releasing pressure of the stem against the plunger, and allowing water to flow through at least one bypass slot in the plunger as the elongated lever is pulled up,
- wherein, when the user presses the elongated lever, stem, and plunger to a lowest position, a watertight seal is created at the lowest position, and the user is able to fill the cylinder with water at a top of the cylinder in the brew head,
- wherein, when the user pulls up on the elongated lever, the stem and plunger are pulled back up causing the watertight seal at the engagement between the plunger and the stem to be broken, and causing the water filled inside the cylinder to fall by gravity through the plunger, prompting the brew head for a subsequent brewing, and
- wherein the pressure gauge is configured to indicate an amount of pressure that the water is exerting inside the cylinder during brewing as the user exerts manual force to lower the elongated lever.

18. The method of making a beverage using the manual brewing press as in claim 16, the method further comprising:
- preheating the brew head, prior to lowering the elongated lever, utilizing a temperature control system comprising an electric heating element in contact with an outside surface of the cylinder, a temperature sensor attached to the cylinder, and a temperature control box with an input side electrically connected to a power supply and an output side electrically connected to the electric heating element and the temperature sensor,
- wherein the temperature control box is configured to receive temperature readings from the temperature sensor and allow the electric heating element to continue to heat the brew head until it reaches a preset temperature of the brew head set by the user on the temperature control box, and
- wherein once the preset temperature is achieved, the temperature control box is configured to maintain the preset temperature until the user turns off the power supply to the temperature control box.

19. The method of making a beverage using the manual brewing press as in claim 14, further comprising
- disengaging the stem from the plunger by rotating the stem less than 180 degrees; and
- removing the stem from the brew head for pouring the water into the cylinder or cleaning the inside of the brew head.

* * * * *